United States Patent
Ueta et al.

(10) Patent No.: US 12,000,113 B2
(45) Date of Patent: Jun. 4, 2024

(54) WORK MACHINE

(71) Applicant: KOBELCO CONSTRUCTION MACHINERY CO., LTD., Hiroshima (JP)

(72) Inventors: Toshiro Ueta, Hiroshima (JP); Michio Hirayama, Hiroshima (JP); Kazuomi Endo, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 274 days.

(21) Appl. No.: 17/763,455

(22) PCT Filed: Sep. 2, 2020

(86) PCT No.: PCT/JP2020/033304
§ 371 (c)(1),
(2) Date: Mar. 24, 2022

(87) PCT Pub. No.: WO2021/065315
PCT Pub. Date: Apr. 8, 2021

(65) Prior Publication Data
US 2022/0389681 A1    Dec. 8, 2022

(30) Foreign Application Priority Data
Sep. 30, 2019   (JP) ................. 2019-180426

(51) Int. Cl.
*E02F 9/26* (2006.01)
*E02F 9/22* (2006.01)
(Continued)

(52) U.S. Cl.
CPC .............. *E02F 9/26* (2013.01); *E02F 9/2271* (2013.01); *E02F 9/24* (2013.01); *G01G 19/10* (2013.01);
(Continued)

(58) Field of Classification Search
CPC ... E02F 9/26; E02F 9/2271; E02F 9/24; E02F 3/32; E02F 9/2228; E02F 9/2285;
(Continued)

(56) References Cited

U.S. PATENT DOCUMENTS

2010/0115936 A1*   5/2010   Williamson .......... E02F 9/2214
                                                                60/446
2019/0264423 A1    8/2019   Kenkel et al.

FOREIGN PATENT DOCUMENTS

CN    104870835 A    8/2015
CN    107250737 A   10/2017
(Continued)

OTHER PUBLICATIONS

International Search Report dated Oct. 20, 2020 in PCT/JP2020/033304 filed on Sep. 2, 2020 (2 pages).
(Continued)

*Primary Examiner* — Rodney A Butler
(74) *Attorney, Agent, or Firm* — Oblon, McClelland, Maier & Neustadt, L.L.P.

(57) ABSTRACT

In a work machine, a load information output part outputs a load calculated by a load calculation part as load information before a piston member shifting toward a stroke end reaches
(Continued)

a specific position, and a load storage part stores the load calculated by the load calculation part as a specific load when the piston member shifting toward the stroke end reaches the specific position. The load information output part further outputs the specific load as the load information after the piston member shifting toward the stroke end enters a specific region.

6 Claims, 12 Drawing Sheets

(51) Int. Cl.
    *E02F 9/24*    (2006.01)
    *G01G 19/10*    (2006.01)
    *E02F 3/32*    (2006.01)

(52) U.S. Cl.
    CPC ............... *E02F 3/32* (2013.01); *E02F 9/2228* (2013.01); *E02F 9/2285* (2013.01); *E02F 9/2292* (2013.01)

(58) Field of Classification Search
    CPC ......... E02F 9/2292; E02F 3/435; E02F 9/264; E02F 9/2214; E02F 3/28; E02F 3/36; E02F 3/38; E02F 3/40; E02F 9/20; E02F 9/22; G01G 19/10
    See application file for complete search history.

(56) References Cited

FOREIGN PATENT DOCUMENTS

| CN | 107938745 A | 4/2018 |
|---|---|---|
| EP | 1 445 386 A1 | 8/2004 |
| JP | 11-82425 A | 3/1999 |
| JP | 11-230821 A | 8/1999 |
| JP | 2002-21122 A | 1/2002 |
| JP | 2002-294765 A | 10/2002 |
| JP | 2012-103029 A | 5/2012 |
| JP | 2015-227582 A | 12/2015 |
| JP | 2018-154976 A | 10/2018 |

OTHER PUBLICATIONS

Extended European Search Report dated Nov. 2, 2022, in corresponding European Patent Application No. 20871227.3, 10 pages.

\* cited by examiner

WORK MACHINE

TECHNICAL FIELD

The present invention relates to a work machine, such as a hydraulic excavator.

BACKGROUND ART

Work machines, such as hydraulic excavators, have been conventionally known. Each of the hydraulic excavators includes: a machine body having a lower traveling body and an upper slewing body; a working device including a plurality of movable parts (a boom, an arm, and a bucket); and a plurality of hydraulic cylinders (a boom cylinder, an arm cylinder, and a bucket cylinder) which operate to respectively drive the movable parts. The hydraulic excavator performs a loading work for loading an object of a work, such as soil and sand, to a destination, e.g., a dump truck, on a work site. The hydraulic excavator is known to be mounted with a payload function. The payload function serves to measure a load of the soil and sand held by the bucket. A load of the soil and sand is calculated by using, for example, a cylinder pressure of the boom cylinder.

Each of the hydraulic cylinders has a cylinder main body and a piston member which shifts with respect to the cylinder main body, the piston member having a cushion mechanism which attenuates an impact to occur when the piston member reaches a stroke end. The cushion mechanism increases a cylinder pressure of the hydraulic cylinder and reduces a shift speed of the piston member as the piston member shifting toward the stroke end enters a cushion region, thereby attenuating the impact. In this respect, measurement of the load of the soil and sand using the payload function is not accurately performed due to an influence of the increased cylinder pressure of the boom cylinder when the piston member of the boom cylinder enters the cushion region.

Technologies disclosed in Patent Literature 1 and Patent Literature 2 have been proposed to avoid the aforementioned influence attributed to the cushion region.

Patent Literature 1 discloses a technology of displaying a message encouraging a boom lowering manipulation, when the boom reaches a rise limit and enters a hydraulic cushion region where the boom executes a relief operation and thus an accurate load pressure is undetectable (paragraph [0042] and FIG. 11 of Patent Literature 1).

Patent Literature 2 discloses a technology of, when a hydraulic cylinder reaches each of extension and contraction stroke ends and thus an accurate pressure is undetectable, executing the following three ways (paragraph [0040] of Patent Literature 2): calculating a load value based on a pressure of a boom cylinder; calculating a load value based on a pressure of an arm cylinder; and calculating a load value based on a pressure of a bucket cylinder (paragraph [0026] of Patent Literature 2), thereby giving priority to the calculated load values and determining an optimal load value therefrom. Specifically, when the hydraulic cylinder extends or contracts to the stroke end, the hydraulic cylinder is determined as being unsuitable for calculating a load (paragraph [0019] of Patent Literature 2). A load value relevant to the hydraulic cylinder determined as being unsuitable for the load measurement is given a lower priority than the priority of a load value of a hydraulic cylinder which is not determined as being unsuitable (see paragraph [0025] of Patent Literature 2).

The technology of Patent Literature 1 which requires an operator to perform a boom lowering manipulation for detecting an accurate load pressure has a drawback of a decrease in a work efficiency in the loading work. The technology of Patent Literature 2 which requires the calculation of the plurality of load values through the plurality of ways demands a plurality of pressure sensors for respectively detecting the pressures of the hydraulic cylinders.

CITATION LIST

Patent Literature

Patent Literature 1: Japanese Unexamined Patent Publication No. 2002-294765
Patent Literature 2: Japanese Unexamined Patent Publication No. 2012-103029

SUMMARY OF INVENTION

The present invention has an object of providing a work machine which can suppress a decrease in a work efficiency and acquire a load of an object of a work held by an attachment by avoiding an influence attributed to a cushion region without calculation of a plurality of load values based on pressures of a plurality of hydraulic cylinders.

A provided work machine includes: a machine body; a working device including a plurality of movable parts which are movable relative to the machine body, the movable parts including an attachment for holding an object of a work; a hydraulic cylinder having a cylinder main body and a piston member which shifts in a stroke direction with respect to the cylinder main body by receiving a supply of a hydraulic fluid into the cylinder main body to drive one of the movable parts; a pressure detection part which detects a cylinder pressure of the hydraulic cylinder; a load calculation part which calculates a load of the object held by the attachment by using the cylinder pressure; a load storage part; and a load information output part. The hydraulic cylinder includes a cushion mechanism, and has a stroke range representing a maximum range where the piston member is shiftable in the stroke direction with respect to the cylinder main body. The stroke range includes a cushion region constituting an end region having a stroke end which is one end of the stroke range. The cushion mechanism is configured to increase the cylinder pressure and reduce a shift speed of the piston member as the piston member shifting toward the stroke end enters the cushion region. In the work machine, a specific position is predetermined at a location spaced from the cushion region in a direction away from the stroke end, and a region between the specific position and the stroke end is predetermined as a specific region. The load information output part outputs the load calculated by the load calculation part as load information of the load of the object before the piston member shifting toward the stroke end reaches the specific position. The load storage part stores the load calculated by the load calculation part as a specific load when the piston member shifting toward the stroke end reaches the specific position. The load information output part outputs the specific load as the load information after the piston member shifting toward the stroke end enters the specific region.

DESCRIPTION OF EMBODIMENTS

Hereinafter, a preferable embodiment of the present invention will be described with reference to the accompanying drawings.

Figure 1:
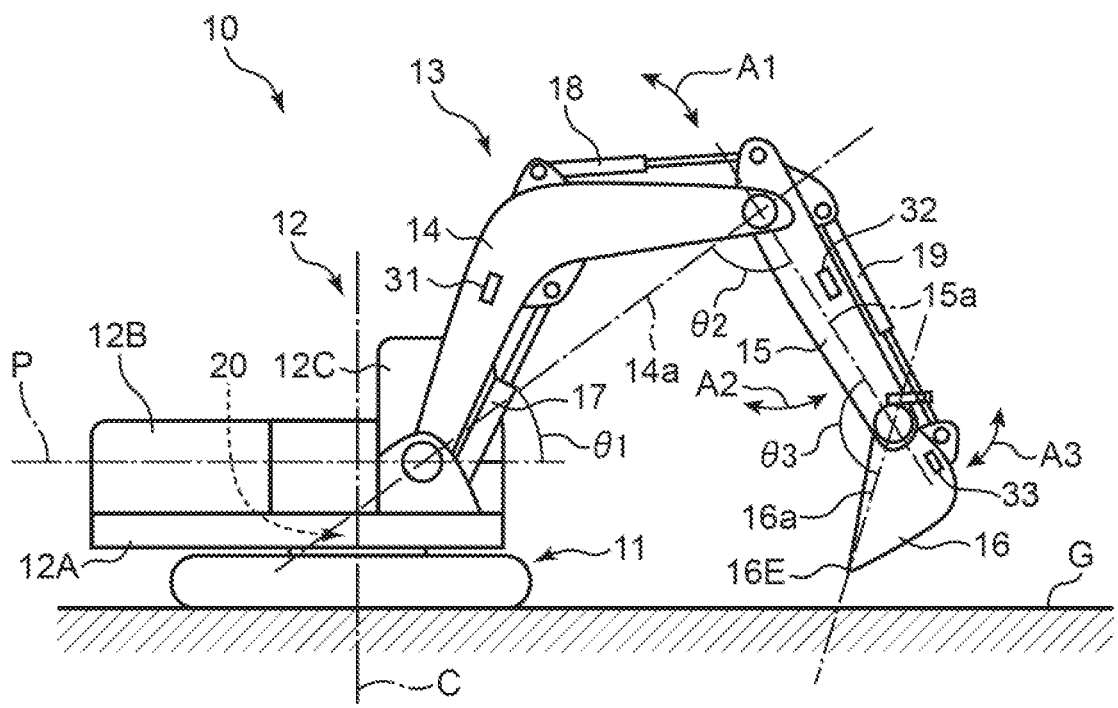
FIG. 1 is a sideview of a hydraulic excavator which is an example of a work machine according to an embodiment of the present invention.
Figure 2:
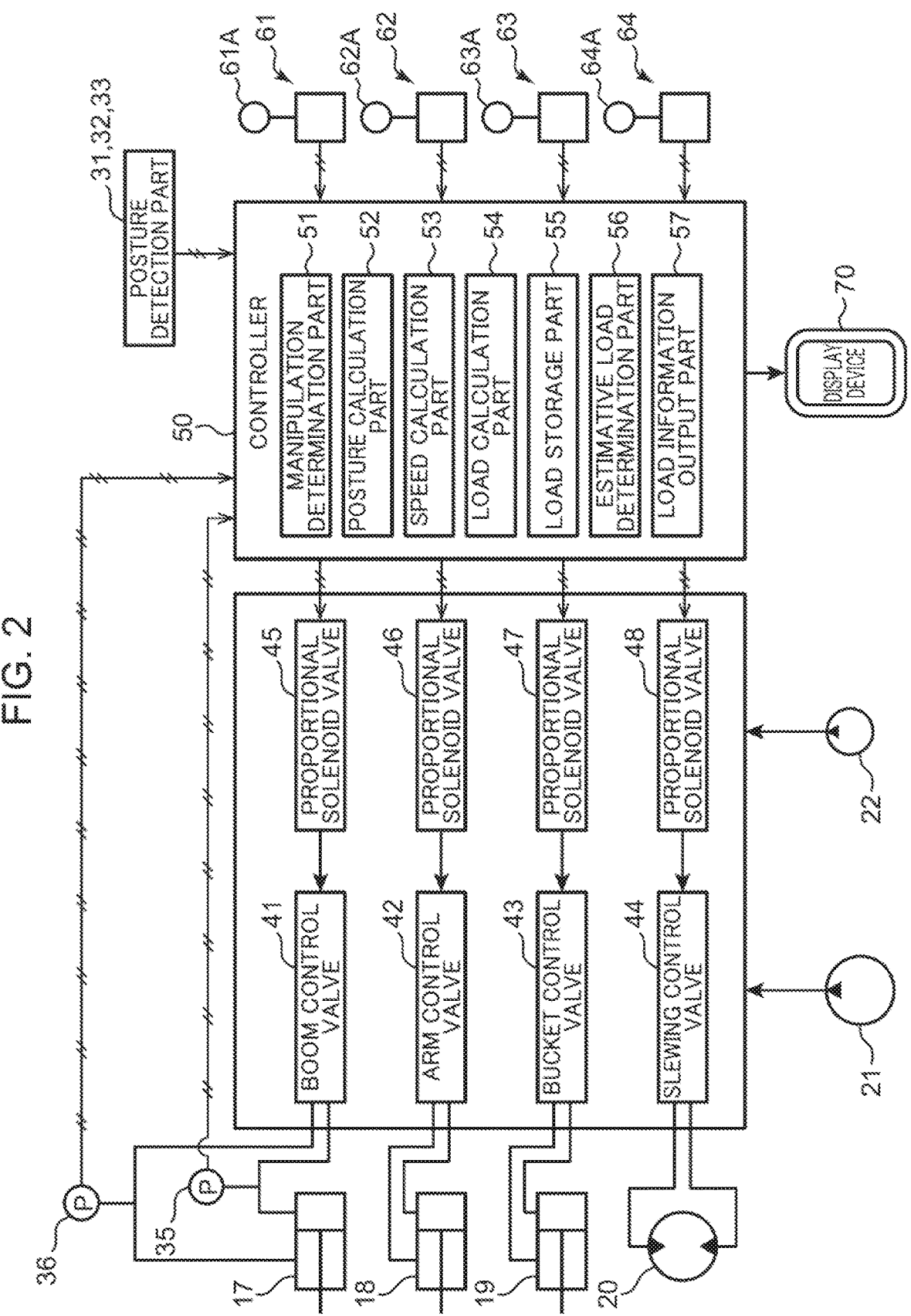
FIG. 2 is a view showing a configuration of a controller mounted on the hydraulic excavator and a circuit controlled by the controller.

FIG. 1 shows a hydraulic excavator which is an example of a work machine according to an embodiment of the present invention. FIG. 2 is a view showing a configuration of a controller mounted on the hydraulic excavator and a circuit controlled by the controller.

As shown in FIG. 1 and FIG. 2, a hydraulic excavator 10 includes: a lower traveling body 11; an upper slewing body 12 slewably mounted on the lower traveling body 11; a working device 13 mounted on the upper slewing body 12; a plurality of hydraulic actuators; at least one hydraulic pump 21; a pilot pump 22; a plurality of manipulation devices; a plurality of control valves; a plurality of pressure sensors; a posture detection part; and a controller 50.

The lower traveling body 11 and the upper slewing body 12 constitute a machine body which supports the working device 13. The lower traveling body 11 has an unillustrated traveling device causing the hydraulic excavator 10 to travel, and thus can travel on the ground G. The upper slewing body 12 has a slewing frame 12A, and an engine room 12B and a cab 12C mounted thereon. The engine room 12B accommodates an engine, and the cab 12C has a seat which allows an operator to sit thereon, various manipulation levers, and various manipulation pedals.

The working device 13 includes a plurality of movable parts which are movable relative to the machine body. The plurality of movable parts can perform a loading work for loading soil and sand to a dump truck. The movable parts include a boom 14, an arm 15, and a bucket 16. The soil and sand exemplifies an object of the work, the dump truck exemplifies a destination, and the bucket 16 exemplifies an attachment.

The loading work includes: a holding task (excavation task) of excavating the soil and sand and holding the excavated soil and sand by the bucket 16; a carrying task of carrying the soil and sand being held to reach right above the dump truck; and a discharge task (soil discharge task) of discharging the soil and sand at a position above the dump truck. The soil and sand discharged in the discharge task drops from the bucket 16 to be loaded to the dump truck.

The boom 14 has a proximal end supported on a front portion of the slewing frame 12A tiltably, i.e., rotatably about a horizontal axis, as indicated by arrow A1 in FIG. 1, and a distal end opposite to the proximal end. The arm 15 has a proximal end attached to the distal end of the boom 14 rotatably about a horizontal axis as indicated by arrow A2 in FIG. 1, and a distal end opposite to the proximal end. The bucket 16 has a proximal end attached to the distal end of the arm 15 rotatably about a horizontal axis as indicated by arrow A3 in FIG. 1.

The hydraulic actuators include a plurality of hydraulic cylinders and a slewing motor 20. The hydraulic cylinders include at least one boom cylinder 17 which moves the boom 14, an arm cylinder 18 which moves the arm 15, and a bucket cylinder 19 which moves the bucket 16. Although FIG. 2 illustrates only the singe hydraulic pump 21, the hydraulic excavator 10 may include a plurality of hydraulic pumps.

The at least one boom cylinder 17 is located between the upper slewing body 12 and the boom 14, and extends or contracts by receiving a supply of a hydraulic fluid discharged from the hydraulic pump 21 to thereby cause the boom 14 to rotate in a rising direction or a lowering direction indicated by the arrow A1.

The arm cylinder 18 is located between the boom 14 and the arm 15, and extends or contracts by receiving a supply of the hydraulic fluid to thereby rotate the arm 15 in an arm pulling direction or an arm pushing direction indicated by the arrow A2. The arm pulling direction is a direction in which the distal end of the arm 15 moves closer to the boom 14, and the arm pushing direction is a direction in which the distal end of the arm 15 moves away from the boom 14.

The bucket cylinder 19 is located between the arm 15 and the bucket 16, and extends or contracts by receiving a supply of the hydraulic fluid to thereby rotate the bucket 16 in a bucket pulling direction or a bucket pushing direction indicated by the arrow A3. The bucket pulling direction is a direction in which an angle θ3 between a straight line 15a representing a longitudinal direction of the arm 15 shown in FIG. 1 and a straight line 16a representing a direction of the bucket 16 decreases, and the bucket pushing direction is a direction in which the angle θ3 increases.

The slewing motor 20 is a hydraulic motor which operates to slew the upper slewing body 12 by receiving a supply of the hydraulic fluid. The slewing motor 20 has an unillustrated output shaft which rotates by receiving a supply of the hydraulic fluid and is connected to the upper slewing body 12 for slewing the upper slewing body 12 in left and right directions. Specifically, the slewing motor 20 has a pair of ports. One of the ports is aimed at receiving a supply of the hydraulic fluid so that the output shaft rotates in a direction corresponding to the one of the ports, and the other of the ports is aimed at discharging the hydraulic fluid therefrom.

The boom cylinder 17 has a cushion mechanism. Although the cushion mechanism is exemplified by an aspect shown in FIG. 3 in the embodiment, the cushion mechanism is not limited to the aspect shown in FIG. 3 and can adopt various aspects. Hereinafter, a structure of the cushion mechanism of the boom cylinder 17 will be described with reference to FIG. 3.

Figure 3:
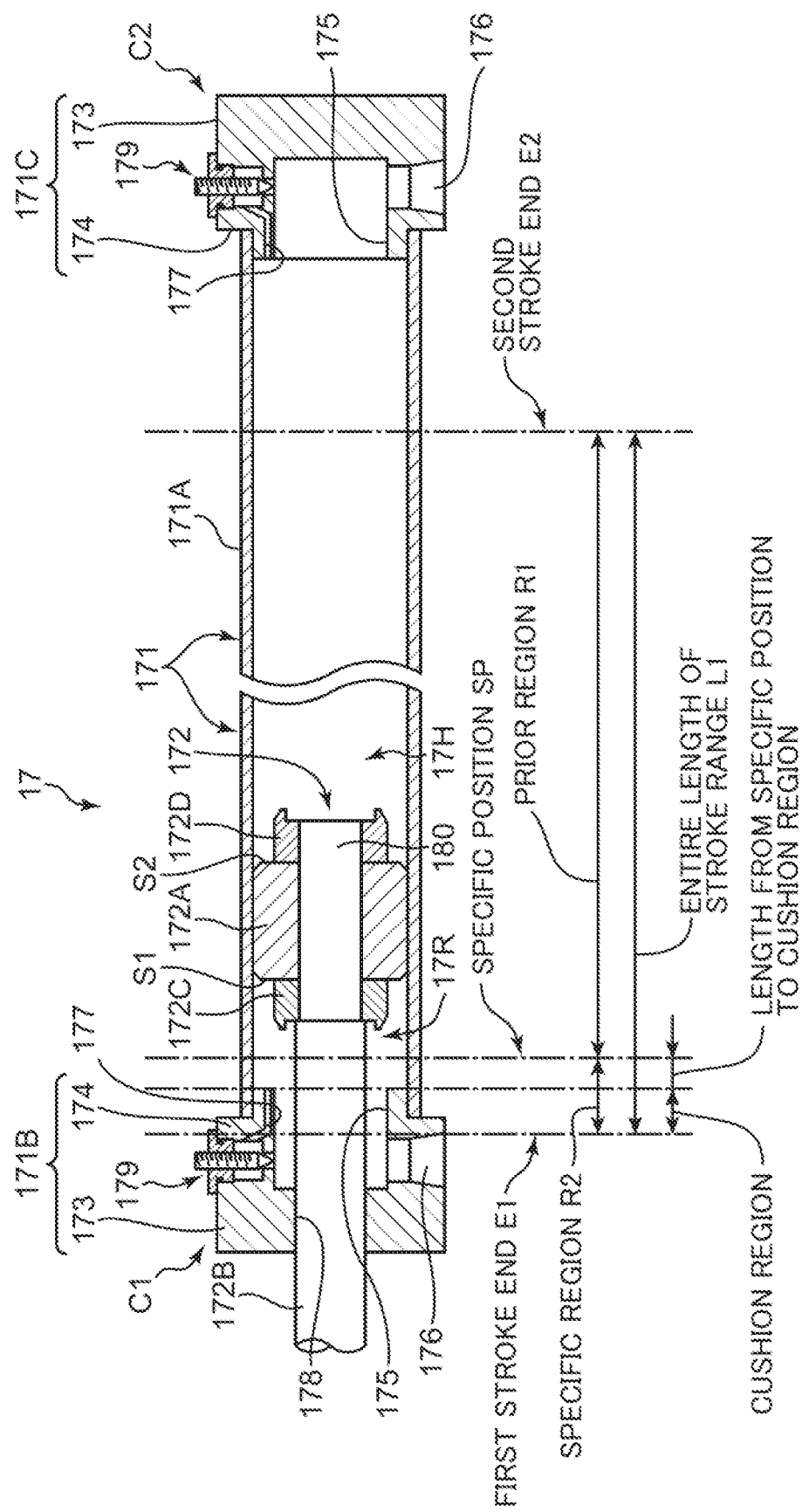
FIG. 3 is a cross-sectional view of a boom cylinder included in the hydraulic excavator.

Each of FIG. 3 to FIG. 6 is a cross-sectional view of the boom cylinder 17. As shown in FIG. 3, the boom cylinder 17 has a cylinder main body 171 and a piston member 172. In the boom cylinder 17, the piston member 172 shifts, to drive the boom 14, with respect to the cylinder main body 171 in a stroke direction, i.e., a longitudinal direction of the boom cylinder 17, by receiving a supply of a hydraulic fluid into the cylinder main body 171.

The cylinder main body 171 has a cylindrical part 171A, a first cover 171B, and a second cover 171C. The piston member 172 has a piston 172A, a piston rod 172B, a first cushion ring 172C, and a second cushion ring 172D.

The first cover 171B and the second cover 171C of the cylinder main body 171 are attached to the cylindrical part 171A to close openings at both ends of the cylindrical part 171A respectively.

The first cover 171B has a bottom 173 and a body 174 having a cylindrical shape and extending from the bottom 173 toward the cylindrical part 171A. The body 174 has a distal end connected to one of the ends of the cylindrical part 171A at the corresponding opening thereof.

The first cover 171B has a recess 175, a supply passage 176, a bypass passage 177, and a through hole 178. The recess 175 is a space defined by an inner circumferential surface of the body 174 and a bottom surface of the bottom 173, and communicates with a space (accommodating space) defined by an inner circumferential surface of the cylindrical part 171A. The supply passage 176 serves as an inlet port or outlet port for the hydraulic fluid discharged from the hydraulic pump 21. The bypass passage 177 serves as a hydraulic passage having one opening on a distal end surface of the body 174 and another opening on the inner circumferential surface of the body 174 to connect the openings to each other therebetween. The bypass passage 177 is provided with a throttle mechanism 179, e.g., a throttle valve, in an intermediate section thereof. The throttle mechanism 179 can adjust a flow passage cross-sectional area of the bypass passage 177. The through hole 178 penetrates the bottom 173 in the stroke direction for allowing the piston rod 172B to be inserted therethrough.

The second cover 171C has a structure similar to the structure of the first cover 171B except that the second cover does not have the through hole 178, and thus details of description for the second cover will be omitted by giving the same reference numerals as those for the first cover 171B.

The piston rod 172B has a rod proximal end 180 constituting a proximal end thereof, and an unillustrated rod distal end constituting a distal end thereof. The rod proximal end 180 is accommodated in an inner space (accommodating space) of the cylinder main body 171. The piston 172A is mounted to the proximal end 180 of the piston rod 172B and configured to be slidable along the inner circumferential surface of the cylindrical part 171A of the cylinder main body 171. In this manner, the inner space of the cylinder main body 171 is divided into a rod chamber 17R and a head chamber 17H. The first cushion ring 172C is mounted to the proximal end 180 of the piston rod 172B at a position adjacent to the piston 172A in the rod chamber 17R. The second cushion ring 172D is mounted to the proximal end 180 of the piston rod 172B at a position adjacent to the piston 172A in the head chamber 17H.

The first cushion ring 172C has such a size as to suitably fit in the recess 175 of the first cover 171B. The second cushion ring 172D has such a size as to suitably fit in the recess 175 of the second cover 171C.

The boom cylinder 17 has a first cushion mechanism C1 operable to attenuate an impact when the boom cylinder 17 extends and the piston member 172 approaches a first stroke end E1 (stroke end in the extension), and a second cushion mechanism C2 operable to attenuate an impact when the boom cylinder 17 contracts and the piston member 172 approaches a second stroke end E2 (stroke end in the contraction).

The first cushion mechanism C1 is mainly composed of the first cushion ring 172C, the first cover 171B, and a first end surface S1 of the piston 172A. The second cushion mechanism C2 is mainly composed of the second cushion ring 172D, the second cover 171C, and a second end surface S2 of the piston 172A. The first cushion mechanism C1 and the second cushion mechanism C2 have the similar structure, and therefore, only the first cushion mechanism C1 will be described below.

Figure 6:
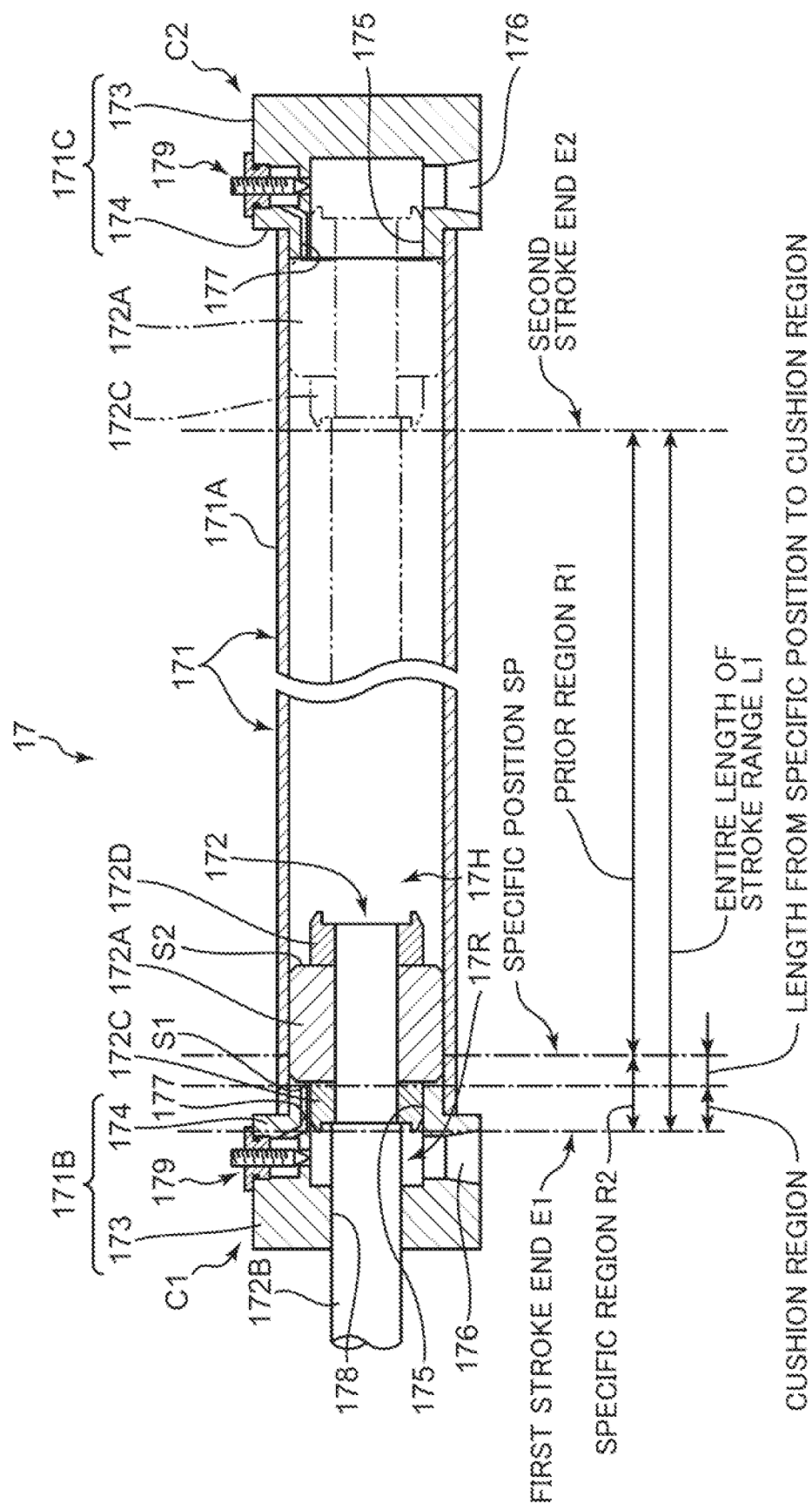
FIG. 6 is a cross-sectional view of the boom cylinder.

As shown in FIG. 6, the piston member 172 has a stroke range representing a maximum range where the piston member 172 is shiftable in the stroke direction with respect to the cylinder main body 171, the stroke range extending from the first stroke end E1 to the second stroke end E2. The stroke range has an entire length L1 denoted by an arrow shown in FIG. 6. FIG. 6 illustrates the piston member 172 at the first stroke end E1 by a solid line and the piston member 172 at the second stroke end E2 by the long-dashed double-dotted line.

The stroke range includes a cushion region constituting an end region having the first stroke end E1 which is one end of the stroke range. The first cushion mechanism C1 is configured to increase the cylinder pressure and reduce a shift speed of the piston member 172 as the piston member 172 shifting toward the first stroke end E1 enters the cushion region.

Figure 4:
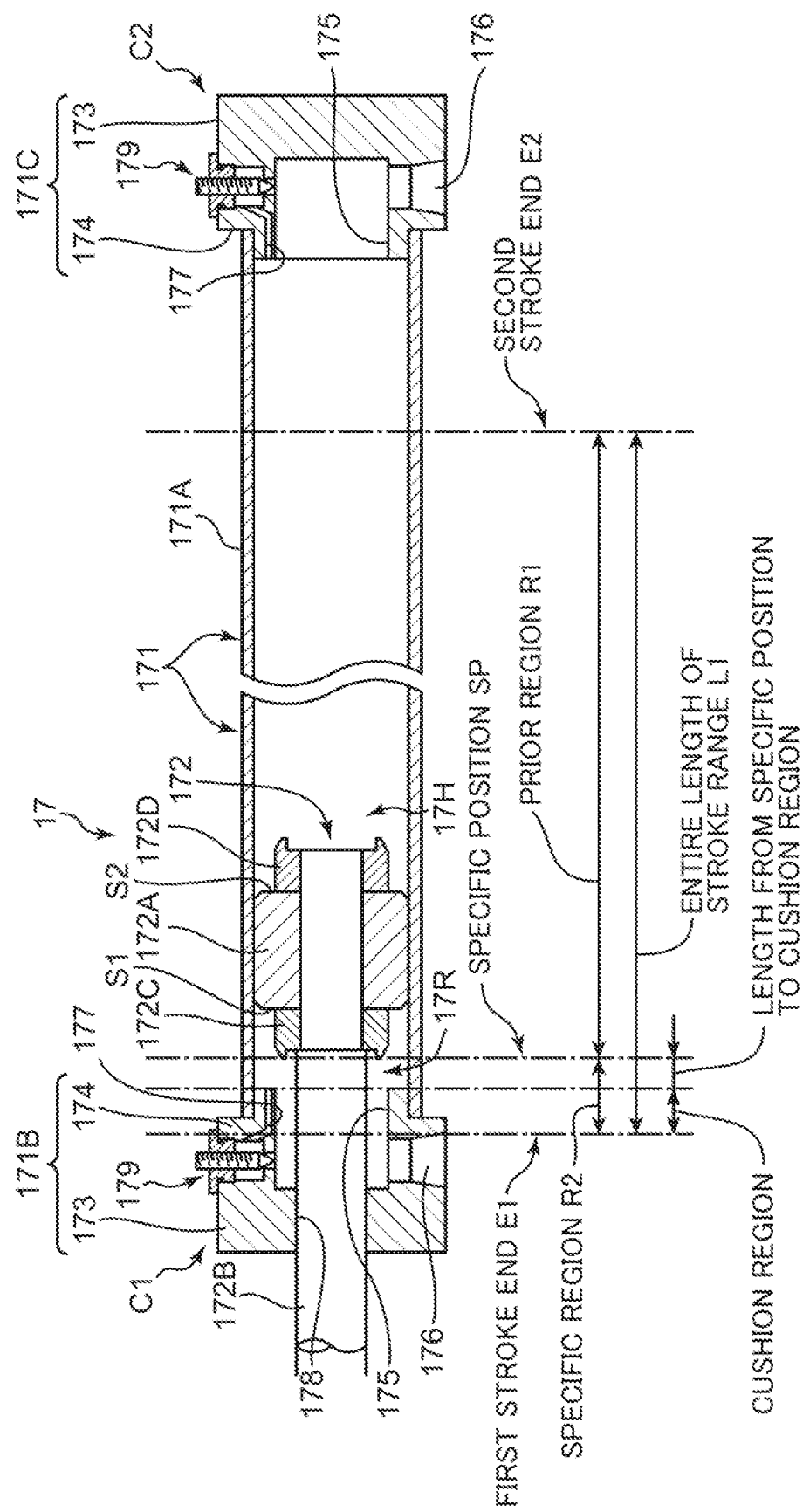
FIG. 4 is a cross-sectional view of the boom cylinder.
Figure 5:
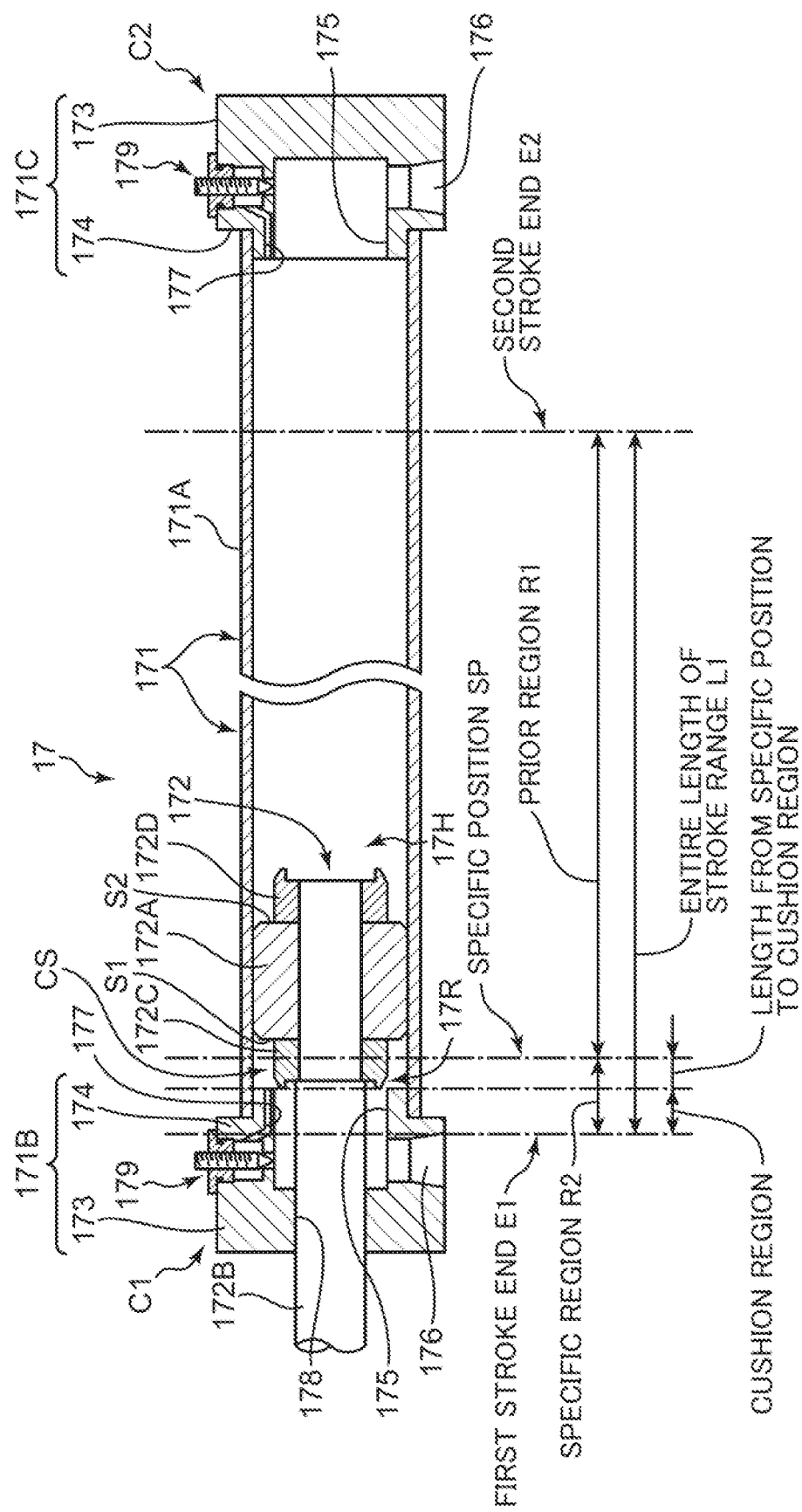
FIG. 5 is a cross-sectional view of the boom cylinder.

Specifically, the piston member 172 shifting toward the first stroke end E1 sequentially shifts from the position shown in FIG. 3, to the position shown in FIG. 4, to the position shown in FIG. 5, and to the position shown in FIG. 6. As shown in FIG. 5, the piston 172A and the first cushion ring 172C of the piston member 172 approach the first stroke end E1, and then the first cushion ring 172C enters the recess 175 of the first cover 171B. As a result, the first cushion ring 172C, a portion of the inner circumferential surface of the cylindrical part 171A that encloses the first cushion ring 172C, and the first end surface S1 of the piston 172A define a cushion space CS thereamong (see FIG. 5). The hydraulic fluid accommodated in the cushion space CS flows to the recess 175 through the bypass passage 177 communicating with the cushion space CS. At this time, a flow rate in the bypass passage 177 is restricted by the throttle mechanism 179, and thus the pressure in the cushion space CS increases. Accordingly, a braking force acts on the piston member 172. Consequently, the shift speed of the piston member 172 reduces and the impact is attenuated.

Figure 7:
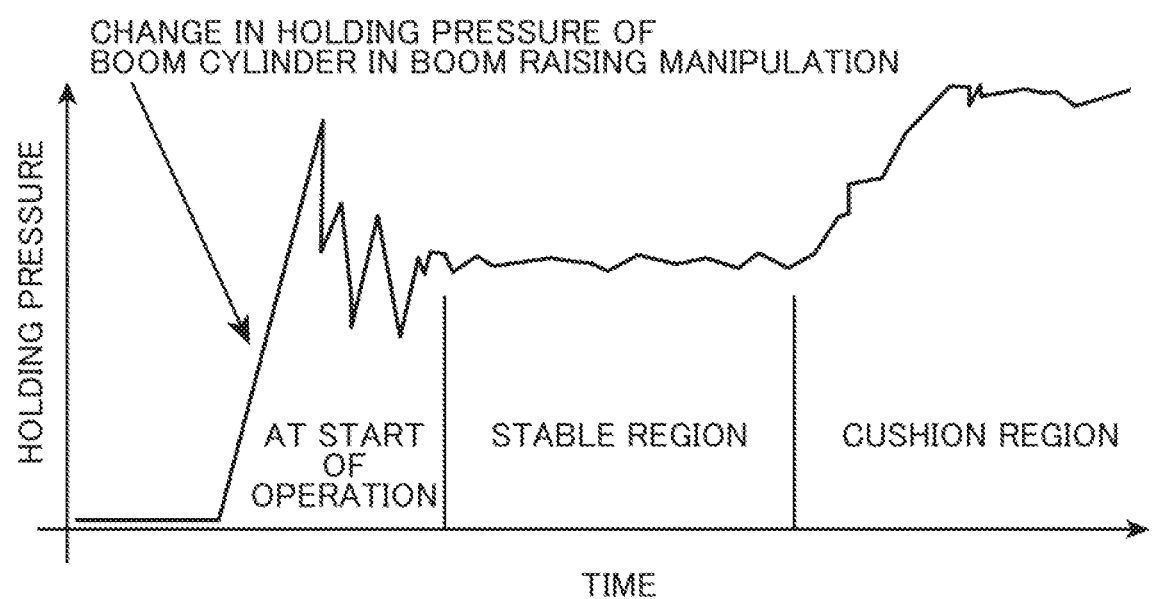
FIG. 7 is a graph showing a change in a cylinder pressure of the boom cylinder.

FIG. 7 is a graph showing a chronological change in the cylinder pressure of the boom cylinder 17. Specifically, FIG. 7 shows an exemplary chronological change in the cylinder pressure until the piston member 172 shifting toward the first stroke end E1 from a region prior to the cushion region (a prior region R1 which will be described later) enters the cushion region in response to a boom raising manipulation which will be described later. As shown in FIG. 7, when the first cushion ring 172C of the piston member 172 enters the recess 175 of the first cover 171B in the cylinder main body 171, the pressure (holding pressure) in the rod chamber 17R of the boom cylinder 17 rapidly increases (in the cushion region in FIG. 7).

When referring back to FIG. 2, the manipulation devices include a boom manipulation device 61, an arm manipulation device 62, a bucket manipulation device 63, and a slewing manipulation device 64. The manipulation devices 61 to 64 respectively have manipulation levers 61A to 64A for each receiving a manipulation by the operator. Each of the manipulation devices may be constituted by a hydraulic manipulation device or an electric manipulation device. One manipulation lever may serve as a plurality of manipulation levers. For instance, a right manipulation lever located in front of the seat, which allows the operator to sit thereon, at a right position thereof may serve as a boom lever when manipulated in a front-rear direction, and serve as a bucket lever when manipulated in a left-right direction. Similarly, a left manipulation lever located in front of the seat at a left position thereof may serve as an aim lever when manipulated in the front-rear direction and serve as a slewing lever when manipulated in the left-right direction. Such lever patterns may be appropriately changed in response to a manipulation instruction from the operator. FIG. 2 shows a circuit configuration for the manipulation devices 61 to 64 each constituted by the electric manipulation device.

The control valves include a boom control valve 41, an arm control valve 42, a bucket control valve 43, a slewing control valve 44, a pair of boom proportional solenoid valves 45, a pair of arm proportional solenoid valves 46, a pair of bucket proportional solenoid valves 47, and a pair of slewing proportional solenoid valves 48.

For example, when the manipulation lever 63A of the bucket manipulation device 63 is manipulated, information about a manipulation amount and a manipulation direction of the manipulation lever 63A is converted to an electric signal (manipulation signal) and the manipulation signal is input to the controller 50. The controller 50 inputs an instruction signal (instruction current) corresponding to the manipulation signal to either of the bucket proportional solenoid valves 47 that corresponds to the manipulation direction of the manipulation lever 63A. The corresponding bucket proportional solenoid valve 47 reduces a pressure of a pilot oil discharged from the pilot pump 22 in response to the instruction signal, and supplies the reduced pilot pressure to either of the pair of pilot ports of the bucket control valve 43. Accordingly, the bucket control valve 43 opens in a direction corresponding to the pilot port to which the pilot pressure is input at a stroke corresponding to the pilot pressure. This results in permitting the hydraulic fluid discharged from the hydraulic pump 21 to flow into a head chamber or a rod chamber of the bucket cylinder 19 at a flow rate corresponding to the stroke. Each of the manipulation levers of the remaining manipulation devices 61, 62, 64 is manipulated in the same manner as the case described above, and thus description therefor will be omitted.

Although a hydraulic circuit for each manipulation device of a hydraulic type is unillustrated here, such a hydraulic circuit included in the hydraulic excavator 10 acts as described below. For example, when the manipulation lever 63A of the bucket manipulation device 63 is manipulated, a pilot primary pressure from the pilot pump 22 is reduced by a remote-control valve of the bucket manipulation device 63 depending on the manipulation amount of the manipulation lever 63A, and the reduced pilot pressure is output from the remote-control valve. The output pilot pressure is input to either of the pair of pilot ports of the bucket control valve 43. Accordingly, the bucket control valve 43 opens in a direction corresponding to the pilot port to which the pilot pressure is input at a stroke corresponding to the pilot pressure. This results in permitting the hydraulic fluid discharged from the hydraulic pump 21 to flow into a head chamber or a rod chamber of the bucket cylinder 19 at a flow rate corresponding to the stroke.

As shown in FIG. 2, the pressure sensors include a pressure sensor 35 which detects a head pressure (an example of the cylinder pressure) of the boom cylinder 17 and a pressure sensor 36 which detects a rod pressure (another example of the cylinder pressure) of the boom cylinder 17. Each of the pressure sensor 35 and the pressure sensor 36 forms a pressure detection part.

The posture detection part includes a boom posture detector 31 which can detect posture information on the boom 14, an arm posture detector 32 which can detect posture information on the arm 15, and a bucket posture detector 33 which can detect posture information on the bucket 16. In the embodiment, each of the posture detectors 31, 32, 33 is composed of, for example, an Inertial Measurement Unit (IMU).

The posture detection part may include a stroke sensor, may include an angle sensor, or may include a position detector utilizing a satellite positioning system. Specifically, a posture of the boom 14, a posture of the arm 15, and a posture of the bucket 16 may be calculated, for example, based on a stroke value of a stroke of each of the boom cylinder 17, the arm cylinder 18, and the bucket cylinder 19 as detected by the stroke sensor. The posture of the boom 14, the posture of the arm 15, and the posture of the bucket 16 may be calculated, for example, based on an angle value obtained by the angle sensor provided to each of a rotary shaft at the proximal end of the boom 14, a rotary shaft at the proximal end of the arm 15, and a rotary shaft at the proximal end of the bucket 16. Each of the posture of the boom 14, the posture of the arm 15, and the posture of the bucket 16 may be calculated, for example, based on a detection value obtained by the position detector utilizing the satellite positioning system, e.g., a GNSS sensor.

The posture information (posture signal) about each of the posture of the boom 14, the posture of the arm 15, and the posture of the bucket 16 detected by the posture detection part in the manner described above is input to the controller 50.

The controller 50 (mechatronic controller) is composed of a computer including, for example, a CPU, a memory, and other elements, and operably has a manipulation determination part 51, a posture calculation part 52, a speed calculation part 53, a load calculation part 54, a load storage part 55, an estimative load determination part 56, and a load information output part 57.

The manipulation determination part 51 determines whether a manipulation is given to the manipulation lever of each of the manipulation devices 61 to 64. In the case where each of the manipulation devices 61 to 64 is constituted by the electric manipulation device as shown in FIG. 2, each of the manipulation devices 61 to 64 inputs, to the controller 50, a manipulation signal corresponding to a manipulation amount given to the corresponding manipulation lever and a manipulation direction. The manipulation determination part 51 can determine that a manipulation is given to a certain manipulation lever of the corresponding manipulation device, specifically, can determine the manipulation amount given to the manipulation lever and the manipulation direction, in response to the input manipulation signal.

Specifically, in the embodiment, the manipulation determination part 51 can determine that: a boom raising manipulation of extending the boom cylinder 17 or a boom lowering manipulation of contracting the boom cylinder 17 is given to the manipulation lever 61A of the boom manipulation device 61; an arm pulling manipulation of extending the arm cylinder 18 or an arm pushing manipulation of contracting the arm cylinder 18 is given to the manipulation lever 62A of the arm manipulation device 62; a bucket pulling manipulation of extending the bucket cylinder 19 and a bucket pushing manipulation of contracting the bucket cylinder 19 are given to the manipulation lever 63A of the bucket manipulation device 63; and a right slewing manipulation or a left slewing manipulation of slewing the upper slewing body 12 is given to the manipulation lever 64A of the slewing manipulation device 64. In the case of the manipulation devices 61 to 64 each constituted by the electric manipulation device, the manipulation determination part 51 forms a manipulation detection part which can detect a manipulation given to each of the manipulation levers 61A to 64A of the manipulation devices 61 to 64.

In the case where each of the manipulation devices 61 to 64 is constituted by the hydraulic manipulation device, the hydraulic excavator 10 includes a plurality of unillustrated pilot pressure sensors each detecting a pilot pressure output from the remote-control valve depending on a manipulation amount given to the corresponding manipulation lever of each of the manipulation devices 61 to 64. Each of the pilot pressure sensors inputs, to the controller 50, a manipulation signal corresponding to the detected pilot pressure. The manipulation determination part 51 can determine that a manipulation is given to a certain manipulation lever of the corresponding manipulation device, specifically, can determine the manipulation amount given to the manipulation lever and the manipulation direction, in response to the input manipulation signal. In the case of the manipulation devices 61 to 64 each constituted by the hydraulic manipulation device, the pilot pressure sensors and the manipulation determination part 51 form a manipulation detection part which can detect a manipulation given to each of the manipulation levers 61A to 64A of the manipulation devices 61 to 64.

The posture calculation part 52 calculates each of the posture of the boom 14, the posture of the arm 15, and the posture of the bucket 16 in response to the posture signal input from the posture detection part. The posture calculation part 52 may calculate, for example, the boom angle θ1, the arm angle θ2, the bucket angle θ3 shown in FIG. 1 respectively as the posture of the boom 14, the posture of the arm 15, and the posture of the bucket 16 in response to the posture signal.

The boom angle θ1 may be defined between a straight line 14a representing the direction of the boom 14 and a plane P perpendicularly intersecting a slewing central axis C of the upper slewing body 12. The arm angle θ2 may be defined between the straight line 15a representing the direction of the arm 15 and the straight line 14a. The bucket angle θ3 may be defined between the straight line 16a representing the direction of the bucket 16 and the straight line 15a. The straight line 14a may connect the rotary shaft at the proximal end of the boom 14 and a rotary shaft at the distal end of the boom 14 (the rotary shaft at the proximal end of the arm 15) to each other. The straight line 15a may connect the rotary shaft at the proximal end of the arm 15 and a rotary shaft at the distal end of the arm 15 (the rotary shaft at the proximal end of the bucket 16) to each other. The straight line 16a may connect the rotary shaft at the proximal end of the bucket 16 and a distal end 16E of the bucket 16.

The speed calculation part 53 calculates a boom rising speed at which the boom 14 rises in the rising direction. The speed calculation part 53 may calculate, based on a plurality of boom angles θ1 periodically acquired, the boom rising speed (angle speed) by dividing a change amount in the boom angles θ1 by a changed time. Moreover, when the boom posture detector 31 is composed of the stroke sensor, the speed calculation part 53 may calculate, based on a plurality of stroke values of the boom cylinder 17 periodically acquired, an extension speed of the boom cylinder 17 by dividing a change amount in the stroke values by a changed time, and may calculate, based on the calculated extension speed, the boom rising speed.

The load calculation part 54 calculates the load of the object held by the bucket 16 by using the cylinder pressure. For instance, the load calculation part 54 calculates a load of the object held by the bucket 16 in the manner which will be described below. A way of calculating the load of the object is not limited to the following calculation way, and another known way is adoptable to calculate the load.

In the embodiment, the load calculation part 54 calculates the load of the object held by the bucket 16 by using the following Equation 1.

$$M = M1 + M2 + M3 + W \times L \tag{1}$$

In Equation (1), the sign "M" denotes a moment of the boom cylinder 17 around a boom foot pin. The sign "M1" denotes a moment of the boom 14 around a boom foot pin. The sign "M2" denotes a moment of the arm 15 around a boom foot pin. The sign "M3" denotes a moment of the bucket 16 around a boom foot pin. The sign "W" denotes a load of an object, such as soil and sand, held by the bucket 16. The sign "L" denotes a horizontal distance from the boom foot pin to the proximal end of the bucket 16.

The moment M is calculated from the head pressure and the rod pressure of the boom cylinder 17. The moment M1 is calculated by a product of a distance between a gravity center of the boom 14 and the boom foot pin, and a weight of the boom 14. The moment M2 is calculated by a product of a distance between a gravity center of the arm 15 and the boom foot pin, and a weight of the arm 15. The moment M3 is calculated by a product of a distance between a gravity center of the bucket 16 and the boom foot pin, and a weight of the bucket.

A position of the gravity center of the boom 14, a position of the gravity center of the min 15, and a position of the gravity center of the bucket 16 are calculated, based on information about the posture of the working device 13 detected by the posture detection part. The head pressure of the boom cylinder 17 is detected by the pressure sensor 35, and the rod pressure of the boom cylinder 17 is detected by the pressure sensor 36. The horizontal distance L is calculated, based on the information about the posture of the working device 13 detected by the posture detection part.

In the embodiment, the posture detection part, the pressure sensors 35, 36, the posture calculation part 52, and the load calculation part 54 form a load acquisition section which acquires the load of the object held by the bucket 16.

The load storage part 55 stores, as a specific load, the load calculated by the load calculation part 54 when the piston member 172 shifting toward the first stroke end E1 reaches a predetermined specific position SP (see FIG. 4).

The specific position SP is predetermined at a location spaced from the cushion region in a direction away from the first stroke end E1 as shown in FIG. 3.

The stroke range includes the prior region R1 and a specific region R2. The specific region R2 is between the specific position SP and the first stroke end E1. The prior region R1 is closer to the second stroke end E2 than the specific position SP. Specifically, the prior region R1 may be between the specific position SP and the second stroke end E2. In a case where another cushion region (second cushion region) is provided for the second stroke end E2 as well, the prior region R1 may be between the specific position SP and the second cushion region. Further, in a case where another specific position (second specific position) is provided for the second stroke end E2 as well, the prior region R1 may be between the specific position SP and the second specific position. The prior region has a smaller pressure fluctuation than the cushion region as denoted by the "stable region" in FIG. 7. When the boom cylinder 17 starts to move (starts to operate), a momentary pressure fluctuation occurs as shown in FIG. 7.

In the embodiment, the specific region R2 has a length which is equal to or less than 5% of the entire length of the stroke range in the stroke direction. In this manner, the specific position SP is at a set location closer to the first stroke end E1 in the stroke range. As a result, the specific position SP is inevitably set near the cushion region. Accordingly, the specific position SP can be relevant to approaching of the piston member 172 shifting toward the first stroke end E1 to the cushion region.

A lower limit of the length of the specific region R2 in the stroke direction is determinable in consideration of a tolerance in sizes of the cylinder main body and the piston member forming the hydraulic cylinder, and a detection accuracy of a sensor which can detect a stroke position or a corresponding value of the piston member with respect to the cylinder main body. The sensor includes, for example, a stroke sensor, an angle sensor, and other sensors. The lower limit may be set to a value obtained by, for example, adding the length of the cushion region in the stroke direction, a maximum tolerance in the size of the cylinder main body, a maximum tolerance in the size of the piston member, and a resolution of the sensor.

The estimative load determination part 56 determines, based on the load acquired by the load acquisition section, an estimative load of the object estimated to be discharged at the position above the destination in the discharge task when a predetermined estimative load determinative criterion is satisfied.

In the embodiment, the estimative load determinative criterion includes a criterion (boom rising speed reduction criterion) that the boom rising speed reduces in the carrying task. The estimative load determination part 56 can determine whether the boom rising speed reduction criterion is satisfied, for example, in a manner described below.

In the carrying task, when a restoring manipulation signal indicating that a restoring manipulation is given to the manipulation lever 61A of the boom manipulation device 61 is input to the controller 50, the manipulation determination part 51 determines that the restoring manipulation is performed, and the estimative load determination part 56 determines that, based on the determination by the manipulation determination part 51, the boom rising speed reduction criterion forming the estimative load determinative criterion is satisfied. Hereinafter, more details will be described.

In the carrying task to be performed after a completion of the holding task, the operator gives, to the manipulation lever 61A of the boom manipulation device 61, a boom raising manipulation of tilting the manipulation lever 61A in a predetermined direction from a neutral position to hold the manipulation lever 61A at a specific position (e.g., at a full lever position) in the state where the manipulation lever 61A tilts for a boom raising operation. The operator then performs a restoring manipulation of restoring the manipulation lever 61A from the specific position toward the neutral position after confirming that the bucket 16 has approached a target position above the dump truck (destination). Consequently, the boom rising speed starts to reduce. The restoring manipulation signal is an exemplary speed reduction determinative signal for determining a reduction in the boom rising speed in the carrying task.

In the case of the boom manipulation device 61 constituted by the electric manipulation device, the restoring manipulation signal represents the manipulation signal input from the boom manipulation device 61 to the controller 50 when the restoring manipulation is given to the manipulation lever 61A of the boom manipulation device 61. In the case of the boom manipulation device 61 constituted by the hydraulic manipulation device, the restoring manipulation signal represents the manipulation signal input from the pilot pressure sensor to the controller 50 (manipulation signal corresponding to the pilot pressure detected by the pilot pressure sensor) when the restoring manipulation is given to the manipulation lever 61A of the boom manipulation device 61.

Moreover, the estimative load determination part 56 can determine that the boom rising speed reduction criterion is satisfied when determining that the boom rising speed starts to reduce in the carrying task. Specifically, the estimative load determination part 56 can determine that, based on the boom rising speed (speed signal) periodically calculated by the speed calculation part 53, the boom rising speed starts to reduce, that is, an acceleration of the boom raising operation changes to a minus value. The speed signal is an exemplary speed reduction determinative signal for determining a reduction in the boom rising speed in the carrying task.

The determination of the estimative load is triggered by determination made by the estimative load determination part 56 that the boom rising speed reduction criterion is satisfied.

Specifically, when determining that the estimative load determinative criterion (boom rising speed reduction criterion) is satisfied, for example, the estimative load determination part 56 may determine, based on the determination, the load of the object (load of the object held by the bucket 16) acquired by the load acquisition section as the estimative load. Moreover, for instance, the estimative load determination part 56 may determine, as the estimative load, a load acquired and stored after the completion of the holding task when determining that the estimative load determinative criterion (boom rising speed reduction criterion) is satisfied. In a case where a plurality of loads is acquired and stored after the completion of the holding task, an average value of the plurality of loads may be determined as the estimative load, for example.

The estimative load determinative criterion may include a criterion that a reduction manipulation of reducing an amount of the object held by the bucket 16 is detected after the holding task.

In the embodiment, each of the bucket pushing manipulation and the arm pushing manipulation is set as the reduction manipulation in advance. The bucket pushing manipulation exemplifies an attachment discharge manipulation. Each of the bucket pushing manipulation and the arm pushing manipulation can correspond to a manipulation for performing the discharge task. Here, only one of the bucket pushing manipulation and the arm pushing manipulation may be set as the reduction manipulation without the other of the manipulations.

The estimative load determination part 56 may determine the estimative load when the manipulation determination part 51 determines at least one of the bucket pushing manipulation given to the manipulation lever 63A and the arm pushing manipulation given to the manipulation lever 62A.

The determination of the estimative load is made based on the load acquired by the load acquisition section at least at one of times in a detection of the reduction manipulation and before the detection of the reduction manipulation.

Specifically, for example, the estimative load determination part 56 may determine, in response to an input of at least one of the manipulation signal corresponding to the bucket pushing manipulation and the manipulation signal corresponding to the arm pushing manipulation to the controller 50, the load of the object (load of the object held by the bucket 16) acquired by the load acquisition section at the input as the estimative load. Besides, for example, the estimative load determination part 56 may determine, in response to the input of the at least one of the manipulation signals to the controller 50, the load acquired in a time from the completion of the holding task to the input of the at least one of the manipulation signals to the controller 50 as the estimative load. In a case where a plurality of loads is acquired in the time from the completion of the holding task to the input of the at least one of the manipulation signals to the controller 50, an average value of the plurality of loads may be determined as the estimative load, for example.

The load information output part 57 outputs the load calculated by the load calculation part 54 as load information of the load of the object when the piston member 172 is located in the prior region R1 in the stroke range with respect to the specific position SP, and outputs the specific load as the load information when at least a part of the piston member 172 is located in the specific region R2. In other words, before the piston member 172 shifting toward the first stroke end E1 reaches the specific position SP, the load information output part 57 outputs, as the load information, the load calculated by the load calculation part 54 before the reaching of the piston member 172 to the specific position SP. In contrast, the load information output part 57 outputs the specific load as the load information after the piston member 172 enters the specific region R2. The load information output part 57 may output the load (i.e., the load information) of the soil and sand (object) held by the bucket 16 in at least one of the holding task, the carrying task, and the discharge task, in real time.

The load information output part 57 may output, as the load information, information about the determined estimative load to a display device 70. The load information output part 57 may output, in the loading work, a cumulative value of the load of the soil and sand discharged to the dump truck, a target loading amount of the soil and sand to be discharged to the dump truck, and the number of times of the soil discharging to the dump truck.

The display device 70 may be arranged visibly by the operator in the cab 12C of the hydraulic excavator 10. The display device 70 displaying the various kinds of information allows the operator to grasp, in real time, a difference (remaining dischargeable amount of the object) from a target loading amount (loading target) to the dump truck at the time of displaying, and grasp the load of the soil and sand (object) held by the bucket 16 at the time of the displaying. When the amount of the load of the soil and sand (object) held by the bucket 16 is larger than the dischargeable remaining amount, the operator manipulates a specific manipulation lever of the corresponding manipulation device for discharge amount adjustment to thereby drop a portion of the object from the bucket 16 and adjust the load. Thereafter, the operator can load the soil and sand (object) in an amount closer to the target loading amount to the dump truck in the discharge task. The discharge amount adjustment includes reducing an amount of soil and sand (object) held by the bucket 16 by discharging, from the bucket 16, a portion of the soil and sand held by the bucket 16 after the holding task, and adjusting the amount (discharge amount) of the object to be discharged at the position above the dump truck.

The display device 70 may include a display for a personal computer or a mobile information terminal device located in a place different from the hydraulic excavator 10.

Figure 8:
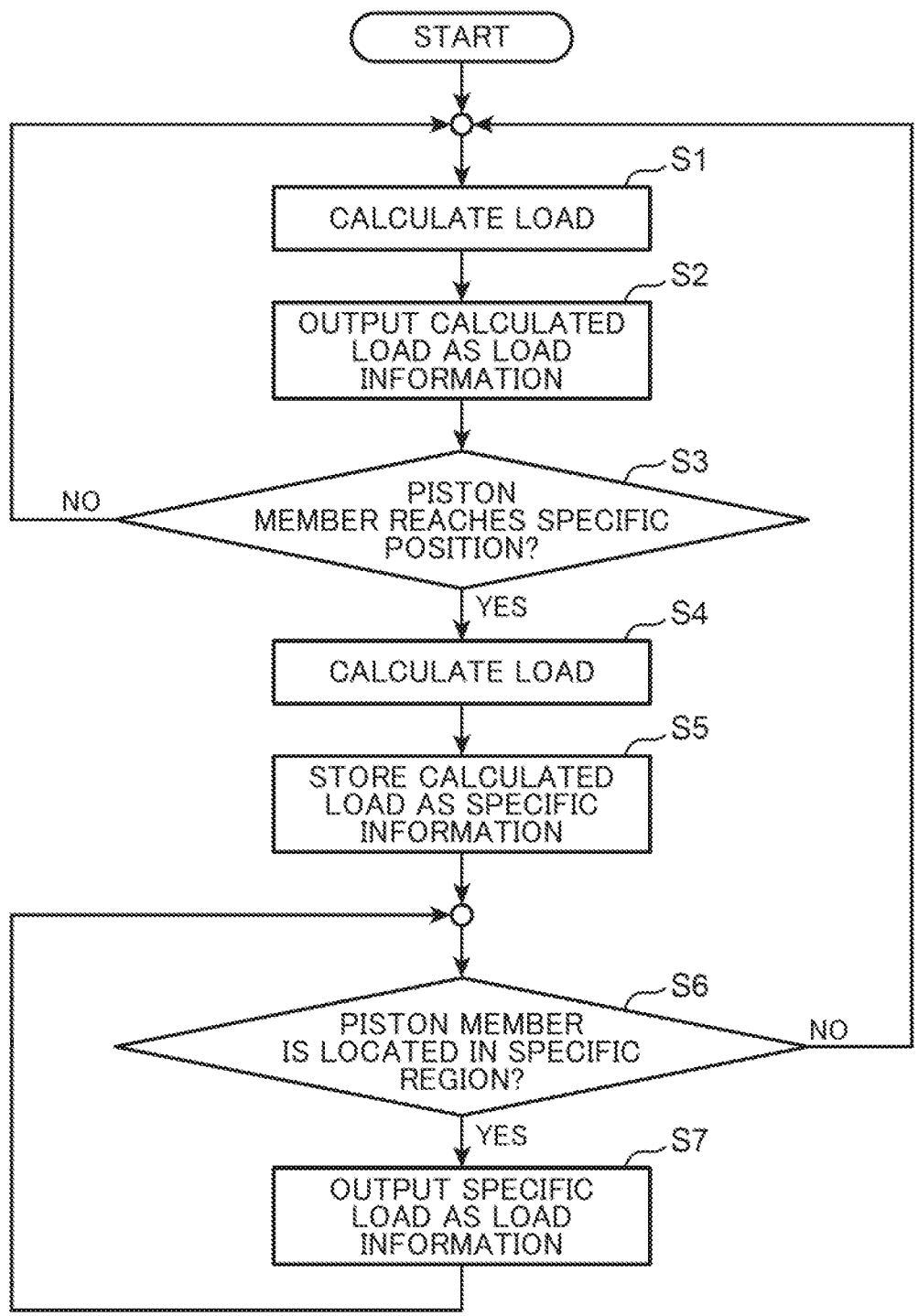
FIG. 8 is a flowchart showing a control operation to be executed by a controller.

FIG. 8 is a flowchart showing a control operation to be executed by the controller 50. FIG. 8 shows the control operation for causing the load information output part 57 to output the load of the soil and sand (object) held by the bucket 16 in the loading work in real time.

The hydraulic excavator 10 includes an unillustrated load measurement switch, for example, disposed in the cab 12C. In the loading work, the control operation as shown in FIG. 8 is, for example, started when the operator turns on the load measurement switch.

The load calculation part 54 of the controller 50 calculates the load of the object held by the bucket 16 through, for example, the above-described way (step S1).

Subsequently, the load information output part 57 outputs the load calculated by the load calculation part 54 as the load information (step S2). The load information output from the load information output part 57 is input to the display device 70 arranged in the cab 12C, and the display device 70 displays the load information thereon. The operator thus can grasp the load of the object, such as the soil and sand, held by the bucket 16 in real time while performing the loading work.

Then, the controller 50 determines whether the piston member 172 shifting toward the first stroke end E1 reaches the specific position SP (step S3). For instance, the determination in step S3 is made in the manner described below.

For example, the manipulation determination part 51 can determine whether the piston member 172 shifts toward the first stroke end E1 in response to a manipulation signal corresponding to the boom raising manipulation given to the manipulation lever 61A of the boom manipulation device 61. The controller 50 may determine, based on the boom rising speed calculated by the speed calculation part 53, whether the piston member 172 shifts toward the first stroke end E1.

The controller 50 may determine, based on the boom angle θ1 calculated by the posture calculation part 52 based on the posture of the boom 14 detected by the posture detection part, whether the piston member 172 reaches the specific position SP. The boom angle θ1 represents a relative position of the piston member 172 to the cylinder main body 171. The controller 50 may determine, based on a stroke value of the boom cylinder 17 detected by the stroke sensor, whether the piston member 172 reaches the specific position SP. The stroke value represents a relative position of the piston member 172 to the cylinder main body 171.

When the controller 50 determines that the piston member 172 shifting toward the first stroke end E1 does not reach the specific position SP (No in step S3), steps S1, S2 are executed.

Conversely, when the controller 50 determines that the piston member 172 shifting toward the first stroke end E1 reaches the specific position SP (YES in step S3), the load calculation part 54 calculates the load of the object held by the bucket 16 (step S4), and the load storage part 55 stores the load calculated by the load calculation part 54 as a specific load (step S5).

The controller 50 determines whether at least a part of the piston member 172 is located in the specific region R2 (step S6). In other words, the controller 50 determines whether the piston member 172 enters the specific region R2 (step S6). For instance, the determination in step S6 is made in the manner described below.

The controller 50 may determine, based on the boom angle θ1 calculated by the posture calculation part 52 based on the posture of the boom 14 detected by the posture detection part, whether the piston member 172 enters the specific region R2. Alternatively, the controller 50 may determine, based on a stroke value of the boom cylinder 17 detected by the stroke sensor, whether the piston member 172 enters the specific region R2.

When the controller 50 determines that the piston member 172 does not enter the specific region R2 (No in step S6), steps S1 to S5 are executed. Specifically, when the controller 50 determines that the piston member 172 does not enter the specific region R2 and is located in the prior region R1 (No in step S6), steps S1 to S5 are executed.

Conversely, when the controller 50 determines that the piston member 172 enters the specific region R2 (YES in step S6), the load information output part 57 outputs the specific load as the load information (Step S7).

Figure 9:
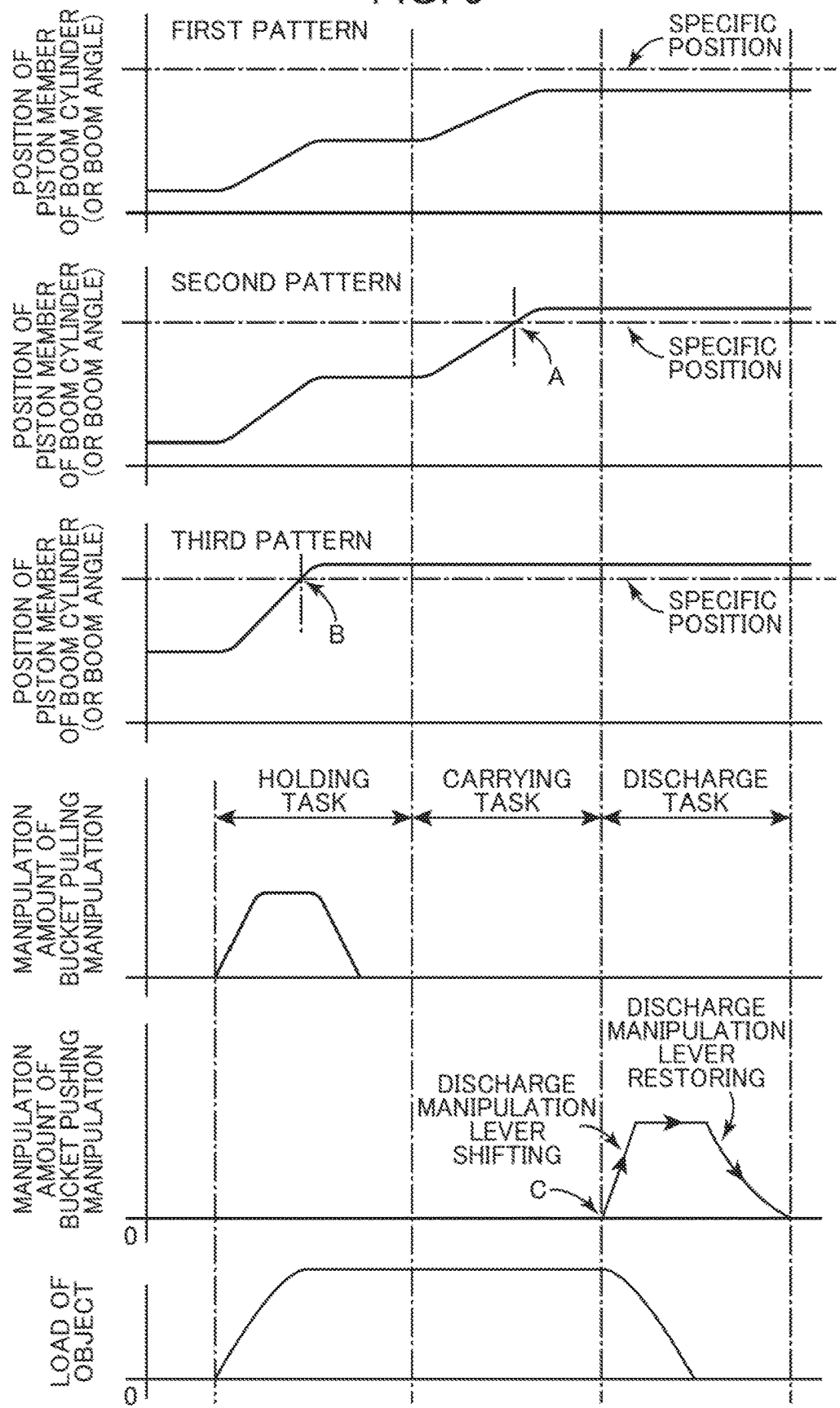
FIG. 9 is a graph showing an exemplary chronological change in each of a position of a piston member of the boom cylinder (or a boom angle), a manipulation amount (manipulation signal) of a bucket manipulation, and a load of soil and sand held by a bucket, in the control operation.

FIG. 9 is a graph showing an exemplary chronological change in each of a position of the piston member 172 of the boom cylinder 17 (or a boom angle), a manipulation amount (manipulation signal) of the bucket manipulation, and the load of soil and sand held by the bucket 16, in the control operation.

As shown in FIG. 9, the holding task (excavation task) includes, for example, the bucket pulling manipulation, the arm pulling manipulation, and the boom raising manipulation. The carrying task includes, for example, the boom raising manipulation and the slewing manipulation. The discharge task (soil discharge task) includes, for example, the bucket pushing manipulation and the arm pushing manipulation. FIG. 9 omits the illustration of the arm pulling manipulation, the arm pushing manipulation, and the slewing manipulation.

In FIG. 9, a topmost graph shows a first pattern of a specific exemplary operation of the boom cylinder 17 in the loading work, a second graph shows a second pattern thereof, and a third graph shows a third pattern thereof. In the first pattern, the piston member 172 of the boom cylinder 17 does not reach the specific position SP in a period from a start to a finish of the loading work. In the second pattern, the piston member 172 of the boom cylinder 17 reaches the specific position SP in the carrying task of the loading work (at a time point denoted by point A in FIG. 9). In the third pattern, the piston member 172 of the boom cylinder 17 reaches the specific position SP in the holding task of the loading work (at a time point denoted by point B in FIG. 9).

In the first pattern, in the period from the start to the finish of the loading work (i.e., a period from a start of the holding task to a finish of the discharge task), the load information output part 57 outputs, as the load information, the load calculated by the load calculation part 54 in that period. In the second pattern, in a period from a start of the holding task to the time point denoted by the point A in the carrying task, the load information output part 57 outputs, as the load information, the load calculated by the load calculation part 54 in that period, and further the load information output part 57 outputs the specific load as the load information after the time point denoted by the point A in the carrying task (i.e., after the piston member 172 enters the specific region R2). In the third pattern, in a period from a start of the holding task to the time point denoted by the point B in the holding task, the load information output part 57 outputs, as the load information, the load calculated by the load calcu-lation part 54 in that period, and further the load information output part 57 outputs the specific load as the load information after the time point denoted by the point B in the holding task (i.e., after the piston member 172 enters the specific region R2).

Figure 10:
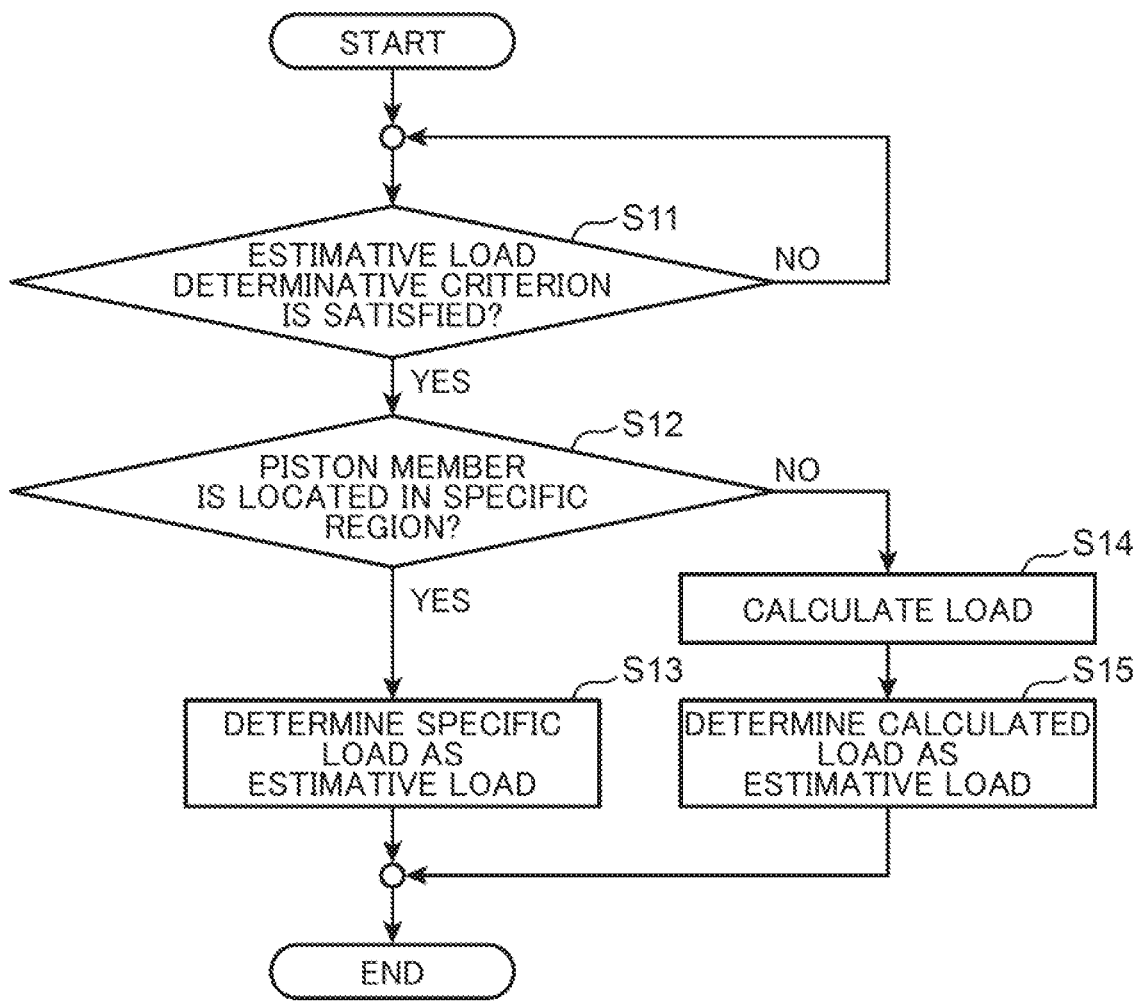
FIG. 10 is a flowchart showing a control operation to be executed by the controller.

FIG. 10 is a flowchart showing a control operation to be executed by the controller 50. The hydraulic excavator 10 includes, for example, an unillustrated estimative load determination control switch disposed in the cab 12C. In the loading work, the control operation as shown in FIG. 10 is, for example, started when the operator turns on the estimative load determination control switch.

In the control operation shown in FIG. 10, for example, the estimative load determination part 56 determines, in a case where the estimative load determinative criterion is satisfied through a bucket pushing manipulation at a time point denoted by point C shown in FIG. 9 (YES in step S11) and the piston member 172 is located in the prior region R1 at the time point (NO in step S12), the load calculated by the load calculation part 54 at the time point as the estimative load (steps S14, S15). This case corresponds to the first pattern shown in FIG. 9.

In contrast, for instance, the estimative load determination part 56 determines, in a case where the estimative load determinative criterion is satisfied through a bucket pushing manipulation at the time point denoted by the point C shown in FIG. 9 (YES in step S11) and the piston member 172 enters the specific region R2 (YES in step S12), the specific load as the estimative load (step S13). This case corresponds to the second and third patterns shown in FIG. 9.

Figure 11:
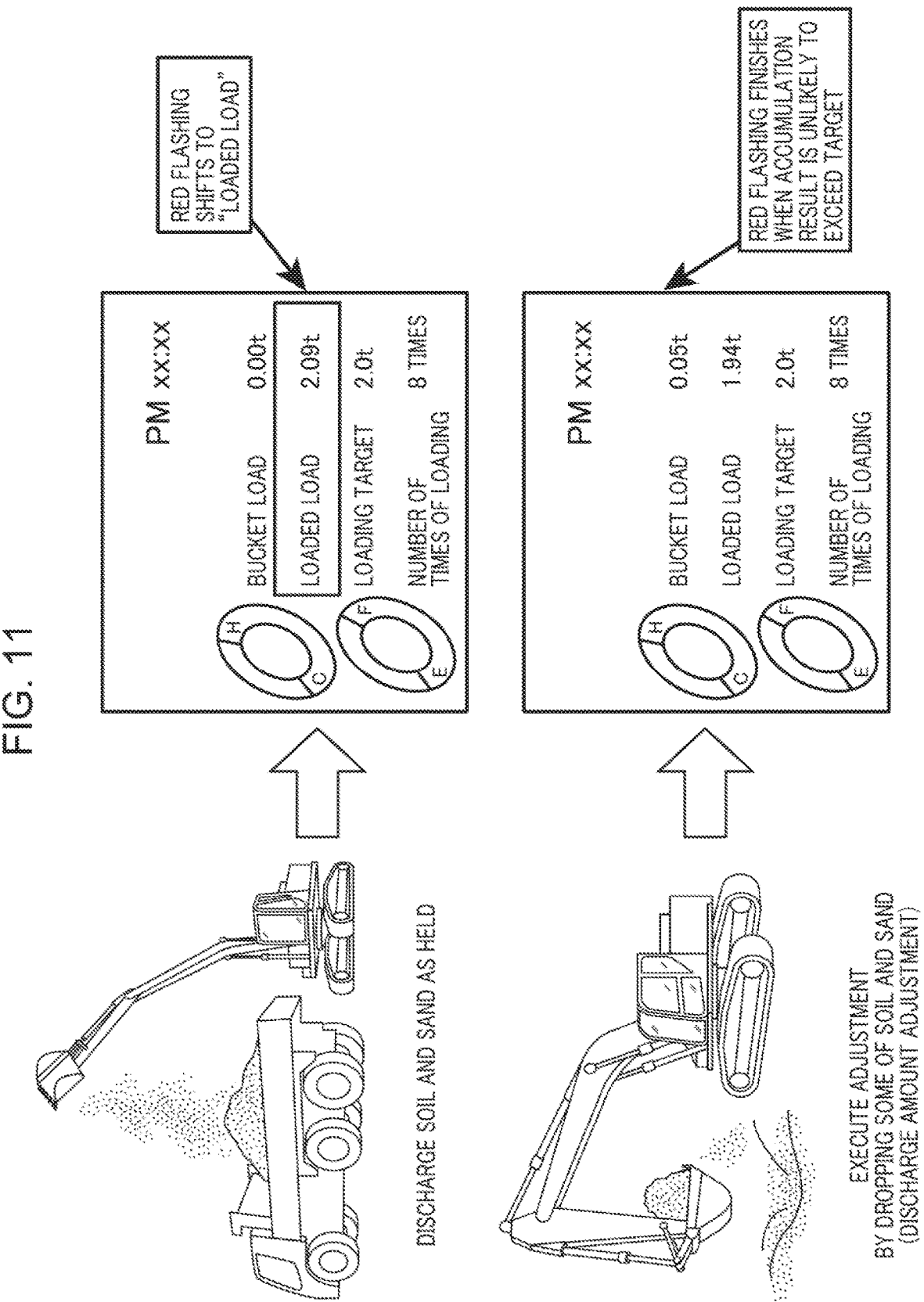
FIG. 11 is a view showing an example of the loading work of soil and sand as performed by the hydraulic excavator and an example of contents displayed on the display device through the control operation.
Figure 12:
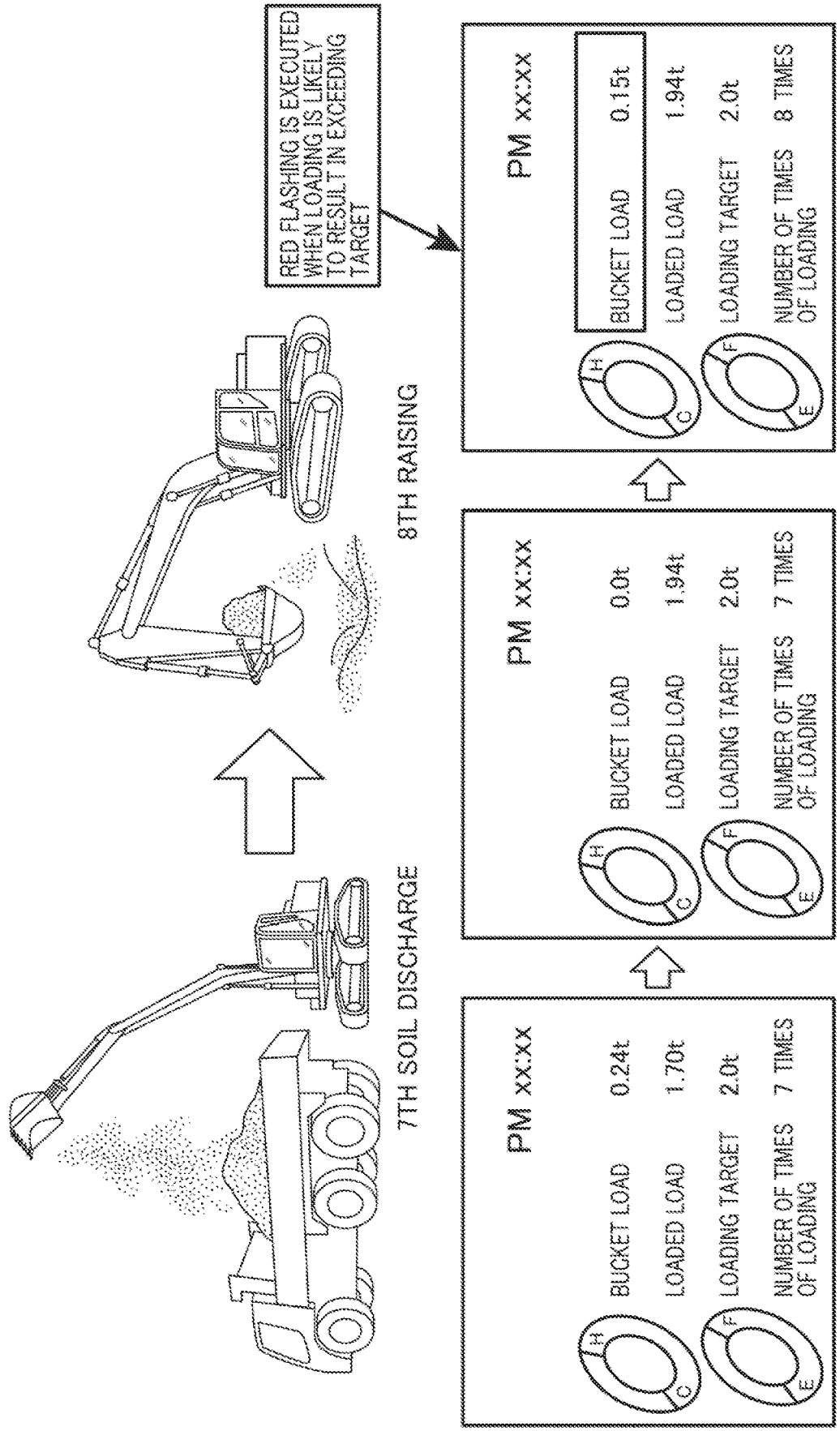
FIG. 12 is a view showing another example of the loading work of soil and sand as performed by the hydraulic excavator and another example of contents displayed on the display device through the control operation.

Each of FIG. 11 and FIG. 12 is a view showing an example of the loading work of soil and sand as performed by the hydraulic excavator 10 and an example of contents displayed on the display device through the control operation.

In a typical sitework, a total load value of the object to be discharged (soil and sand to be discharged) at the position above the dump truck reaches a target loading amount to the dump truck by repeating the loading work a plurality of times. Each of FIG. 11 and FIG. 12 shows an example of the loading work of the soil and sand as performed by the hydraulic excavator 10 and an example of contents displayed on the display device 70 by the control operation. Each of FIG. 11 and FIG. 12 further shows an exemplary case where a total load value ("loaded load" in FIG. 11) of the object reaches a target loading amount ("loading target" in FIG. 11) of 2.0 t under the condition that the loading work has been performed seven times heretofore, and that a discharge task (soil discharge task) in the subsequent eighth loading work will be further performed.

Specific display contents displayed on the display device 70 shown in each of FIG. 11 and FIG. 12 will be described below. The item "bucket load" represents a load held by the bucket 16 to be calculated by the load calculation part 54. The item "loaded load" represents a total load value of the object loaded to a destination, such as the dump truck. FIG. 12 shows that the object of 1.94 t has been loaded in the discharge task (soil discharge task) seven times heretofore. The item "loading target" represents a target amount of the object to be loaded to the destination, such as the dump truck. The item "number of times of loading" represents the number of times of the discharge task (soil discharge task) counted and performed at the destination, such as the dump truck. The item "bucket load" is prominently displayed in the right section in FIG. 12. The prominent displaying aims at notifying that additional loading of the load of 0.15 t held by the bucket 16 to the loaded load of 1.94 t at the destination, such as the dump truck, would exceed the loading target. The prominent displaying is finished when the discharge amount adjustment is executed and the excess state is solved. Furthermore, when the "loaded load" exceeds the "loading target", the item "loaded load" may be prominently displayed as shown in FIG. 11. The prominent displaying may include changing the displaying of the item in an appealing color, e.g., by flashing the item in red. Alternatively, the excess of load may be notified by a warning sound simultaneously, or by a guidance, such as a voice guidance.

Accordingly, in the first to seventh loading works, the operator determines, based on information, i.e., information without the prominent displaying, displayed on the display device 70, no necessity of the discharge amount adjustment of adjusting the amount (discharge amount) of soil and sand held by the bucket 16 in the discharge task, and thus performs the manipulation for an operation of discharging the soil and sand as held by the bucket 16 at the position above the dump truck in the discharge task.

Then, in the eighth loading work, the operator determines, based on information (in the prominent displaying) displayed on the display device 70, the necessity of the discharge amount adjustment, and thus gives the bucket pushing manipulation (reduction manipulation) to the manipulation lever 63A before performing the eighth discharge task. In this manner, the discharge amount adjustment is executed, a portion of the soil and sand held by the bucket 16 drops from the bucket 16, and the amount of the soil and sand held by the bucket 16 reduces. As a result, addition of the load in the bucket to the loaded load would not exceed the loading target, and hence the prominent displaying is finished as shown at the lower right in FIG. 11. The operator can safely perform the eighth discharge task while confirming the screen of the display device 70.

As described heretofore, in the work machine 10 according to the embodiment, the load calculated by the load calculation part 54 before the reaching of the piston member 172 to the specific position SP is output as the load information, when the piston member 172 is located in the prior region R1, specifically, before the piston member 172 shifting toward the first stroke end E1 reaches the specific position SP. Accordingly, a work participant, such as the operator, can properly grasp, based on the output information, the load of the object held by the bucket 16. In contrast, the specific load stored in the load storage part 55 is output as the load information, when at least a part of the piston member 172 is located in the specific region R2, specifically, after the piston member 172 enters the specific region R2. In other words, after the piston member 172 enters the specific region R2, the specific load calculated by the load calculation part 54 when the piston member 172 reaches the specific position SP is considered as the load of the object. The specific position SP is at a location spaced from the cushion region in a direction away from the first stroke end E1. Therefore, even when the cylinder pressure increases as the piston member 172 enters the cushion region, the output load information is not influenced by the increased cylinder pressure. This configuration can avoid such a situation that the load information significantly differs from the load of the object actually held by the bucket 16. The work machine 10 including this configuration eliminates the necessity of the boom lowering manipulation as required in the technology disclosed in Patent Literature 1 even when the piston member 172 enters the cushion region, and thus suppress a decrease in the work efficiency. Additionally, in the work machine 10, each of the load output as the load information when the piston member 172 is located in the prior region R1 and the specific load output as the load information when the piston member 172 enters the specific region R2 is calculated by using the cylinder pressure of at least one of the hydraulic cylinders (the boom cylinder 17 in the embodiment). Consequently, the work machine 10 can detect the cylinder pressure of the at least one of the hydraulic cylinders, and acquire the load of the object of the work held by the bucket 16 by using the cylinder pressure without calculating respective load values based on the pressures of the hydraulic cylinders.

In the work machine 10 according to the embodiment, the specific region R2 has a length which is larger than a length of the cushion region in the stroke direction and is equal to or less than 5% of the entire length of the stroke range. In the work machine 10, the specific position SP is at a location closer to the first stroke end E1 in the stroke range. As a result, the specific position SP is inevitably set near the cushion region constituting an end region of the stroke range. Accordingly, the specific position SP can be relevant to approaching of the piston member 172 shifting toward the first stroke end E1 to the cushion region. The specific load considered as the load of the object after the piston member 172 enters the specific region R2 including the cushion region serves as the load calculated by the load calculation part 54 when the piston member 172 reaches the specific position SP, i.e., a position near the cushion region. This achieves a smaller difference between the specific load and an actual load of the object held by the bucket 16 when the piston member 172 enters the specific region R2. Besides, a large area of the stroke range is occupied by the prior region R1 since the specific position SP is set near the first stroke end E1. Thus, not the specific load but the load calculated by the load calculation part 54 when the piston member 172 is located in the prior region R1 is output as the load information in the large area of the stroke range. This permits the work participant to grasp accurate load information in the large area of the stroke range.

The present invention should not be limited to the embodiment described above. The present invention covers, for example, aspects to be described below.

(A) Work Machine

The work machine is described as the hydraulic excavator 10 in the embodiment, but is not limited thereto and may be another work machine, e.g., a wheel loader.

(B) Estimative Load Determinative Criterion

The estimative load determinative criterion includes a criterion that the reduction manipulation of reducing the amount of the object held by the attachment is detected after the holding task, or a criterion that the boom rising speed reduces in the carrying task in the embodiment, but may further include another criterion.

(C) Attachment

The attachment includes the bucket 16 in the embodiment, but is not limited thereto. The attachment may include other attachment, e.g., a fork, and a grapple. Each of the fork and the grapple serves as an attachment which can hold an object of a work. Each of the fork and the grapple includes a plurality of arms openable and closable to catch and hold the object of the work, like carrying goods and waste woods.

(D) Load Information Output Part

The load information output part may output, as the load information, the load calculated by the load calculation part when a predetermined criterion (pressure increase suppression criterion) for determining suppression of an increase in the cylinder pressure is satisfied in a state where the piston member shifting toward the stroke end enters the specific region. Specific examples will be described below.

The pressure increase suppression criterion may include a criterion that a difference between the cylinder pressure acquired before the piston member 172 shifting toward the first stroke end E1 enters the cushion region and the cylinder pressure acquired after the piston member 172 enters the cushion region is equal to or smaller than a predetermined pressure threshold.

Further, the pressure increase suppression criterion may include a criterion that a manipulation amount of the manipulation lever 61A for shifting the piston member 172 toward the first stroke end E1 is equal to or smaller than a predetermined manipulation amount threshold. Specifically, when the manipulation (i.e., fine manipulation) with the manipulation amount which is equal to or smaller than the manipulation amount threshold is performed, the shift speed of the piston member 172 with respect to the cylinder main body 171 is low. Hence, the cylinder pressure is considered as hardly increasing even when the piston member 172 enters the cushion region.

The pressure increase suppression criterion may further include a criterion that the operation of the boom cylinder 17 stops after the piston member 172 enters the specific region R2.

In this modification, the load information output part 57 outputs, as the load information, the load calculated by the load calculation part 54 after the piston member 172 enters the specific region R2, when the pressure increase suppression criterion is satisfied in a state where the piston member 172 shifting toward the first stroke end E1 enters the specific region R2.

(E) Stroke End

Although the configuration where the piston member 172 of the boom cylinder 17 shifts toward the first stroke end E1 (the stroke end in the extension state) is described in the embodiment, the configuration is not limited thereto. The present invention is applicable to a configuration where the piston member 172 of the boom cylinder 17 shifts toward the second stroke end E2 (the stroke end in the contraction state). In this configuration, a specific position SP is predetermined at a location spaced from the cushion region in the second cushion mechanism C2 closer to the second cover 171C in a direction away from the second stroke end E2, and a region between the specific position SP and the second stroke end E2 is predetermined as a specific region, and consequently, the same control as that in the embodiment is executed.

(F) Other Modifications

In the work machine 10, in a case where the piston member 172 shifting toward the first stroke end E1 enters the specific region R2, then further goes out of the specific region R2 while shifting away from the first stroke end E1, and finally returns to the prior region R1, the load information output part 57 may output, as the load information, a load calculated by the load calculation part 54 after the piston member 172 goes out of the specific region R2.

Conclusively, provided is a work machine which can suppress a decrease in a work efficiency and acquire a load of an object of a work held by an attachment by avoiding an influence attributed to a cushion region without calculating respective load values based on pressures of a plurality of hydraulic cylinders.

A provided work machine includes: a machine body; a working device including a plurality of movable parts which are movable relative to the machine body, the movable parts including an attachment for holding an object of a work; a hydraulic cylinder having a cylinder main body and a piston member which shifts in a stroke direction with respect to the cylinder main body by receiving a supply of a hydraulic fluid into the cylinder main body to drive one of the movable parts; a pressure detection part which detects a cylinder pressure of the hydraulic cylinder; a load calculation part which calculates a load of the object held by the attachment by using the cylinder pressure; a load storage part; and a load information output part. The hydraulic cylinder includes a cushion mechanism, and has a stroke range representing a maximum range where the piston member is shiftable in the stroke direction with respect to the cylinder main body, the stroke range including a cushion region constituting an end region having a stroke end which is one end of the stroke range. The cushion mechanism is configured to increase the cylinder pressure and reduce a shift speed of the piston member as the piston member shifting toward the stroke end enters the cushion region. In the work machine, a specific position is predetermined at a location spaced from the cushion region in a direction away from the stroke end, and a region between the specific position and the stroke end is predetermined as a specific region, the load information output part outputs the load calculated by the load calculation part as load information of the load of the object before the piston member shifting toward the stroke end reaches the specific position. The load storage part stores the load calculated by the load calculation part as a specific load when the piston member shifting toward the stroke end reaches the specific position, and the load information output part outputs the specific load as the load information after the piston member shifting toward the stroke end enters the specific region.

In the work machine, the specific position is predetermined at the location spaced from the cushion region in a direction away from the stroke end. The work machine adopts, as the load information, the specific load stored when the piston member reaches the specific position, after the piston member shifting toward the stroke end enters the specific region. Hence, after the piston member enters the cushion region, the load calculated by the load calculation part when the cylinder pressure increases is not adopted as the load information. The work machine does not require the operator to perform the boom lowering manipulation disclosed in Patent Literature 1, and thus can suppress a decrease in the work efficiency, and further can acquire the load of the object of the work held by the attachment by avoiding the influence attributed to the cushion region even without calculating respective load values based on the pressures of the hydraulic cylinders.

In the work machine, the specific region preferably has a length which is larger than a length of the cushion region in the stroke direction and is equal to or less than 5% of an entire length of the stroke range.

In this aspect, the load calculated by the load calculation part when the piston member is at a location maximally closer to the stroke end is adoptable as the specific load.

In the work machine, the load information output part may output, as the load information, the load calculated by the load calculation part after the piston member enters the specific region, when a predetermined criterion for determination as to whether an increase in the cylinder pressure is suppressed is satisfied in a state where the piston member shifting toward the stroke end enters the specific region.

In this aspect, the cylinder pressure does not greatly increase when the criterion is satisfied even in the state where the piston member enters the specific region. Therefore, no significant difference is seen between the load calculated by the load calculation part and the load of the object actually held by the attachment. In this case, the load calculated by the load calculation part after the piston member enters the specific region may be output as the load information.

The work machine is preferably configured to perform a holding task of holding the object, a carrying task of carrying the object being held to a position above a destination, and a discharge task of discharging the object at the position above the destination. The work machine preferably further includes: an estimative load determination part which determines an estimative load of the object estimated to be discharged at the position above the destination in the discharge task. The estimative load determination part preferably determines, based on the load calculated by the load calculation part, the estimative load in a case where a predetermined estimative load determinative criterion is satisfied before the piston member shifting toward the stroke end reaches the specific position, and determines the specific load as the estimative load in a case where the predetermined estimative load determinative criterion is satisfied after the piston member shifting toward the stroke end enters the specific region.

Selected in this aspect is a way of determining the estimative load depending on the position of the piston member when the estimative load determinative criterion is satisfied. Even in a case where the piston member is at such a position that at least a part of the piston member falls within the specific region when the estimative load determinative criterion is satisfied, i.e., in a case where the estimative load determinative criterion is satisfied in a state where the cylinder pressure increases as the piston member enters the cushion region, the specific load determined as the estimative load is not influenced by the increased cylinder pressure. Therefore, in this aspect, such a situation that the estimative load significantly differs from the load of the object to be actually discharged at the position above the destination in the discharge task is avoided. The determined estimative load is used for calculation of a loading amount of the object, such as the soil and sand, to be loaded to the destination, e.g., the dump truck.

In the work machine, the estimative load determinative criterion may include a criterion that a predetermined reduction manipulation of reducing an amount of the object held by the attachment is executed after the holding task.

In this aspect, the difference between the estimative load and the load of the object to be actually discharged at the position above the destination in the discharge task can be smaller. Specifically, the reduction manipulation forming the estimative load determinative criterion includes reducing the amount of the object held by the attachment. A main exemplary timing at which the reduction manipulation is performed represents a time when the object held by the attachment is discharged at the position above the destination in the discharge task. In other words, in the work machine, association between the timing for the determination of the estimative load and the reduction manipulation can bring the timing for determination of the estimative load closer to the timing of starting the discharge task. In the carrying task to be performed prior to the discharge task, a portion of the object, such as the soil and sand, held by the attachment may drop from the attachment due to, for example, vibration occurring at the attachment in the carrying task. In this respect, bringing the timing for the determination of the estimative load closer to the timing of starting the discharge achieves a smaller difference between the estimative load and the load of the object to be actually discharged at the position above the destination is attainable.

In the work machine, the movable parts may include a boom tiltably supported on the machine body, and the estimative load determinative criterion may include a criterion that a boom rising speed at which the boom rises in a rising direction reduces in the carrying task.

In this aspect, the difference between the estimative load and the load of the object to be actually discharged at the position above the destination in the discharge task can be smaller for the same reason as described above. Specifically, a timing at which the boom rising speed reduces in the carrying task falls within a latter half of the carrying task in many cases. Association between the timing for determination of the estimative load and the timing at which the boom rising speed reduces can bring the timing for the determination of the estimative load closer to the timing of starting the discharge task. This achieves a smaller difference between the estimative load and the load of the object to be actually discharged at the position above the destination.

The invention claimed is:

1. A work machine comprising:
   a machine body;
   a working device including a plurality of movable parts which are movable relative to the machine body, the movable parts including an attachment for holding an object of a work;
   a hydraulic cylinder having a cylinder main body and a piston member which shifts in a stroke direction with respect to the cylinder main body by receiving a supply of a hydraulic fluid into the cylinder main body to drive one of the movable parts;
   a pressure detection part which detects a cylinder pressure of the hydraulic cylinder;
   a load calculation part which calculates a load of the object held by the attachment by using the cylinder pressure;
   a load storage part; and
   a load information output part, wherein
   the hydraulic cylinder includes a cushion mechanism, and has a stroke range representing a maximum range where the piston member is shiftable in the stroke direction with respect to the cylinder main body, the stroke range including a cushion region constituting an end region having a stroke end which is one end of the stroke range, the cushion mechanism being configured to increase the cylinder pressure and reduce a shift speed of the piston member as the piston member shifting toward the stroke end enters the cushion region,
   a specific position is predetermined at a location spaced from the cushion region in a direction away from the stroke end, and a region between the specific position and the stroke end is predetermined as a specific region,
   the load information output part outputs the load calculated by the load calculation part as load information of the load of the object before the piston member shifting toward the stroke end reaches the specific position, and
   the load storage part stores the load calculated by the load calculation part as a specific load when the piston member shifting toward the stroke end reaches the specific position, and
   the load information output part outputs the specific load as the load information after the piston member shifting toward the stroke end enters the specific region.

2. The work machine according to claim 1, wherein the specific region has a length which is larger than a length of the cushion region in the stroke direction and is equal to or less than 5% of an entire length of the stroke range.

3. The work machine according to claim 1, wherein the load information output part outputs, as the load information, the load calculated by the load calculation part after the piston member enters the specific region, when a predetermined criterion for determination as to whether an increase in the cylinder pressure is suppressed is satisfied in a state where the piston member shifting toward the stroke end enters the specific region.

4. The work machine according to claim 1, which is configured to perform a holding task of holding the object, a carrying task of carrying the object being held to a position above a destination, and a discharge task of discharging the object at the position above the destination, the work machine further comprising:
an estimative load determination part which determines an estimative load of the object estimated to be discharged at the position above the destination in the discharge task, wherein
the estimative load determination part is configured to determine, based on the load calculated by the load calculation part, the estimative load in a case where a predetermined estimative load determinative criterion is satisfied before the piston member shifting toward the stroke end reaches the specific position, and determine the specific load as the estimative load in a case where the predetermined estimative load determinative criterion is satisfied after the piston member shifting toward the stroke end enters the specific region.

5. The work machine according to claim 4, wherein the estimative load determinative criterion includes a criterion that a predetermined reduction manipulation of reducing an amount of the object held by the attachment is executed after the holding task.

6. The work machine according to claim 4, wherein the movable parts may include a boom tiltably supported on the machine body, and
the estimative load determinative criterion includes a criterion that a boom rising speed at which the boom rises in a rising direction reduces in the carrying task.

* * * * *